(12) United States Patent
Choi et al.

(10) Patent No.: US 7,236,553 B1
(45) Date of Patent: Jun. 26, 2007

(54) REDUCED DEAD-CYCLE, ADAPTIVE PHASE TRACKING METHOD AND APPARATUS

(75) Inventors: Hoon Choi, Sunnyvale, CA (US); Gyudong Kim, Sunnyvale, CA (US); Daeyun Shim, Cupertino, CA (US); Bruce Kim, Los Altos, CA (US); Seung Ho Hwang, Palo Alto, CA (US)

(73) Assignee: Silicon Image, Inc., Sunnyvale, CA (US)

(*) Notice: Subject to any disclaimer, the term of this patent is extended or adjusted under 35 U.S.C. 154(b) by 630 days.

(21) Appl. No.: 10/763,905

(22) Filed: Jan. 23, 2004

(51) Int. Cl.
    *H04L 7/00* (2006.01)
(52) U.S. Cl. .................. 375/355; 375/325; 375/371; 375/375
(58) Field of Classification Search .......... 375/325, 375/327, 328, 354, 355, 362, 371, 373, 375, 375/376
    See application file for complete search history.

(56) References Cited

U.S. PATENT DOCUMENTS

| | | | |
|---|---|---|---|
| 5,905,769 A | 5/1999 | Lee et al. ............... | 375/376 |
| 6,907,089 B2 * | 6/2005 | Jensen et al. ............ | 375/324 |
| 7,180,966 B2 * | 2/2007 | Vallet et al. ............ | 375/340 |
| 2006/0039513 A1 * | 2/2006 | Sheen et al. | |
| 2006/0062327 A1 * | 3/2006 | Dally | |

* cited by examiner

*Primary Examiner*—Dac V. Ha
(74) *Attorney, Agent, or Firm*—Girard & Equitz LLP

(57) ABSTRACT

A data sampling method and circuit employing an oversampling clock to oversample a data signal, a phase tracker for use with or in a data sampling circuit, and a method for identifying a sequence of best sampling positions for sampling a data signal from signal samples generated using an oversampling clock. In some embodiments, data indicative of the phase of at least one of the oversampling clock's sampling positions relative to the center of the data eye are low-pass filtered in a manner determined by the data signal's bit rate. In other embodiments, the number of dead cycles of the phase tracker decision loop is reduced by generating possible solutions in parallel and moving the feedback point so as to occur as late as practical, or the phase tracker ignores a sample set when updating its determination of the best sampling position when the sample set indicates that the data signal has less than a predetermined number of transitions during a corresponding tracking period.

54 Claims, 6 Drawing Sheets

REDUCED DEAD-CYCLE, ADAPTIVE PHASE TRACKING METHOD AND APPARATUS

FIELD OF THE INVENTION

The invention pertains to methods and circuitry for oversampling data (e.g., data received over high speed serial links) and to phase tracking methods and circuitry for selecting a best sampling position for sampling data from among the sampling positions determined by an oversampling clock. In preferred embodiments, the inventive method and apparatus are adaptive (in the sense that the sampling positions selected thereby depend on the frequency and/or number of transitions of the data signal to be oversampled) and/or accomplish sampling position selection with few dead cycles.

BACKGROUND OF THE INVENTION

The expression "phase tracker" is used herein to denote a sampling position selection circuit that monitors the relative phase of a data signal and an oversampling clock (employed to oversample the data signal), selects a best sampling position (for oversampling the data signal) as a result of this monitoring, and updates the selected sampling position from time to time (e.g., periodically).

As used herein, the expression "sampling position" contemplates that a data signal is oversampled using an oversampling clock having N sampling edges for each data period of the data signal, where there is a phase difference of 360/N degrees between the "i"th sampling edge and the "(i+1)"th sampling edge of the oversampling clock (where "i" is an integer, and N is an integer greater than one), and the data period is equal to 1/(the data signal's bit rate). Each of the N edges for each data period belongs to a different "sampling position." Thus, the oversampling clock has N sets of sampling edges, each set having a different phase (relative to any arbitrarily selected edge of the oversampling clock). Each such set of sampling edges is denoted herein as a "sampling position."

The term "receiver" is used herein in a broad sense to denote any device capable of receiving and decoding data that has been transmitted over a link (e.g., a serial link) and optionally also performing additional functions, which can include decrypting the received data and other operations related to decoding, reception, or decryption of the received data. For example, the term receiver can denote a transceiver that performs the functions of a transmitter as well as the functions of a receiver.

The terms "data" and "data signal" are used in a broad sense herein (in the context of sampling of "data" or a "data signal") to denote any signal capable of being oversampled. Examples of a data signal are a signal indicative of a clock, and a signal indicative of an arbitrary sequence of binary bits of information (also referred to as binary bits of data).

The expression "center of the data eye" (of a data signal indicative of binary data) is used herein to denote the optimal phase at which to sample the data signal. When the data signal is indicative of a periodic sequence of "zero" bits alternating with "one" bits, the center of the data eye is 180 degrees out of phase with the transitions between the zero bits and one bits. More generally, when the data signal has constant bit rate and is indicative of any sequence of "zero" and "one" bits (including many transitions between zero bits and one bits), the center of the data eye is 180 degrees out of phase with the transitions between the zero bits and one bits (i.e., 180 degrees out of phase with a periodic signal that is aligned with the transitions between the zero bits and one bits).

Various serial links for transmitting data and clock signals are well known.

One conventional serial link, used primarily for high-speed transmission of video data from a host processor (e.g., a personal computer) to a monitor, is known as a transition minimized differential signaling interface ("TMDS" link). The characteristics of a TMDS link include the following:

1. video data are encoded and then transmitted as encoded words (each 8-bit word of digital video data is converted to an encoded 10-bit word before transmission);

a. the encoding determines a set of "in-band" words and a set of "out-of-band" words (the encoder can generate only "in-band" words in response to video data, although it can generate "out-of-band" words in response to control or sync signals. Each in-band word is an encoded word resulting from encoding of one input video data word. All words transmitted over the link that are not in-band words are "out-of-band" words);

b. the encoding of video data is performed such that the in-band words are transition minimized (a sequence of in-band words has a reduced or minimized number of transitions);

c. the encoding of video data is performed such that the in-band words are DC balanced (the encoding prevents each transmitted voltage waveform that is employed to transmit a sequence of in-band words from deviating by more than a predetermined threshold value from a reference potential. Specifically, the tenth bit of each "in-band" word indicates whether eight of the other nine bits thereof have been inverted during the encoding process to correct for an imbalance between running counts of ones and zeroes in the stream of previously encoded data bits);

2. the encoded video data and a video clock signal are transmitted as differential signals (the video clock and encoded video data are transmitted as differential signals over conductor pairs);

3. three conductor pairs are employed to transmit the encoded video, and a fourth conductor pair is employed to transmit the video clock signal; and 4. signal transmission occurs in one direction, from a transmitter (typically associated with a desktop or portable computer, or other host) to a receiver (typically an element of a monitor or other display device).

A use of the TMDS serial link is the "Digital Visual Interface" interface ("DVI" link) adopted by the Digital Display Working Group. It will be described with reference to FIG. 1. A DVI link can be implemented to include two TMDS links (which share a common conductor pair for transmitting a video clock signal) or one TMDS link, as well as additional control lines between the transmitter and receiver. The DVI link of FIG. 1 includes transmitter 1, receiver 3, and the following conductors between the transmitter and receiver: four conductor pairs (Channel 0, Channel 1, and Channel 2 for video data, and Channel C for a video clock signal), Display Data Channel ("DDC") lines for bidirectional communication between the transmitter and a monitor associated with the receiver in accordance with the conventional Display Data Channel standard (the Video Electronics Standard Association's "Display Data Channel Standard," Version 2, Rev. 0, dated Apr. 9, 1996), a Hot Plug Detect (HPD) line (on which the monitor transmits a signal that enables a processor associated with the transmitter to identify the monitor's presence), Analog lines (for transmitting analog video to the receiver), and Power lines (for providing DC power to the receiver and a monitor associated with the receiver). The Display Data Channel standard specifies a protocol for bidirectional communication between a transmitter and a monitor associated with a receiver, including transmission by the monitor of an Extended Display Identification ("EDID") message that specifies various characteristics of the monitor, and transmission by the transmitter of control signals for the monitor. Transmitter 1 includes three identical encoder/serializer units (units 2, 4, and 6) and additional circuitry (not shown). Receiver 3 includes three identical recovery/decoder units (units 8, 10, and 12) and inter-channel alignment circuitry 14 connected as shown, and additional circuitry (not shown).

As shown in FIG. 1, circuit 2 encodes the data to be transmitted over Channel 0, and serializes the encoded bits. Similarly, circuit 4 encodes the data to be transmitted over Channel 1 (and serializes the encoded bits), and circuit 6 encodes the data to be transmitted over Channel 2 (and serializes the encoded bits). Each of circuits 2, 4, and 6 responds to a control signal (an active high binary control signal referred to as a "data enable" or "DE" signal) by selectively encoding either digital video words (in response to DE having a high value) or a control or synchronization signal pair (in response to DE having a low value). Each of encoders 2, 4, and 6 receives a different pair of control or synchronization signals: encoder 2 receives horizontal and vertical synchronization signals (HSYNC and VSYNC); encoder 4 receives control bits CTL0 and CTL1; and encoder 6 receives control bits CTL2 and CTL3. Thus, each of encoders 2, 4, and 6 generates in-band words indicative of video data (in response to DE having a high value), encoder 2 generates out-of-band words indicative of the values of HSYNC and VSYNC (in response to DE having a low value), encoder 4 generates out-of-band words indicative of the values of CTL0 and CTL1 (in response to DE having a low value), and encoder 6 generates out-of-band words indicative of the values of CTL2 and CTL3 (in response to DE having a low value). In response to DE having a low value, each of encoders 4 and 6 generates one of four specific out-of-band words indicative of the values 00, 01, 10, or 11, respectively, of control bits CTL0 and CTL1 (or CTL2 and CTL3).

Each of the out-of-band control words (indicative of CTL0 and CTL1, or CTL2 and CTL3) is encoded as a 10-bit, transition-maximized code word indicative of two control bits (CTL0 and CTL1, or CTL2 and CTL3). Each of the out-of-band sync words (indicative of HSYNC and VSYNC) is encoded as a 10-bit, transition-maximized code word indicative of two sync bits (HSYNC and VSYNC).

In operation of the FIG. 1 system, a cable comprising connectors 20 and 21 and conductors 22 is connected between transmitter 1 and receiver 3. Conductors 22 include a conductor pair for transmitting serialized data over Channel 0 from encoder 2 to decoder 8, a conductor pair for transmitting serialized data over Channel 1 from encoder 4 to decoder 10, a conductor pair for transmitting serialized data over Channel 2 from encoder 6 to decoder 12, and a conductor pair for transmitting a video clock over Channel C from transmitter 1 to receiver 3. Conductors 22 also include wires for the DDC channel (which can be used for bidirectional I2C communication between transmitter 1 and receiver 3), a Hot Plug Detect (HPD) line, "Analog" lines for analog video transmission from transmitter 1 to receiver 3, and "Power" lines for provision of power from transmitter 1 to a receiver 3.

In the FIG. 1 system, the frequency of the video clock signal transmitted over Channel C is typically one-tenth the bit rate at which data transmission occurs over each of the data channels (Channels 0, 1, and 2), in the sense that ten data bits are transmitted over each data channel during each video clock period. This can be accomplished by employing nine delay cells in the transmitter to generate nine multiphase delayed versions of the video clock, and using the nine delayed versions of the video clock (each having a different phase) together with the video clock itself to transmit data over each of Channels 0, 1, and 2, at a rate of ten bits per video clock period.

In receiver 3, the data signal received on Channel 0 is sampled in unit 8, the data signal received on Channel 1 is sampled in unit 10, and the data signal received on Channel 2 is sampled in unit 12. The samples are decoded to recover data, control, or sync bits, and the decoded bits are asserted to circuitry 14.

Another serial link is the "High Definition Multimedia Interface" interface (sometimes referred to as an "HDMI" link or interface) developed Silicon Image, Inc., Matsushita Electric, Royal Philips Electronics, Sony Corporation, Thomson Multimedia, Toshiba Corporation, and Hitachi.

Other serial links include the set of serial links known as Low Voltage Differential Signaling ("LVDS") links (e.g., "LDI," the LVDS Display Interface), each of which satisfies the TIA/EIA-644 standard or the IEEE-1596.3 standard, ethernet links, fiberchannel links, serial ATA links used by disk drives, and others.

To recover data transmitted over links (e.g., TMDS links or other serial links), the received data signals are often oversampled. Phase tracking has an important role in data recovery (e.g., recovery of high-speed serial data) performed by blind oversampling systems. Phase tracking determines the relative phase of a received data signal and the oversampling clock employed to oversample the data signal, and picks a best sampling position (i.e., the best relative phase between the data signal and the clock edges at which the data signal is sampled).

U.S. Pat. No. 5,905,769, issued May 18, 1999, describes a conventional phase tracking method and apparatus. The circuitry described with reference to FIG. 6 of U.S. Pat. No. 5,905,769 implements a phase tracking algorithm in connection with 3× oversampling of a data signal having a data period equal to 1/(the data signal's bit rate), and employs a digital PLL circuit to accomplish phase alignment of the oversampling clock with the data signal and to select one "best" sample of each set of three samples obtained per data period.

Phase trackers have an important role in the data recovery process implemented by high-speed serial data receivers. However, there are many issues that make their design difficult, including the following three. First, the input data frequency that the phase tracker has to handle generally ranges over a wide frequency range (e.g., from 25 MHz to 220 MHz in some applications), but the characteristics of input data in low frequency and those of input data in high frequency are very different. For example, when oversampling low frequency data, jitter becomes relatively fast because of the low input frequency (phase tracking circuitry uses a clock whose frequency is the same as or has a linear relationship to that of the data). So, the phase tracker has to decide quickly (e.g., to change a sampling position) in order to track the input changes correctly. In addition, when oversampling low frequency data there is typically not much noise in the input signal and the signal is typically quite clean. Inter-symbol interference is also small in low frequency data. The inventors have recognized that when the input data have relatively low frequency, it is unnecessary to use a low-pass filter in the phase tracking decision procedure (as conventionally used to prevent wrong decisions due to noise) and a low-pass filter can cause incorrect sampling position selection (typically due to the added delay in the decision process).

On the other hand, when oversampling high frequency data, jitter becomes relatively slow since the phase tracker's clock becomes relatively fast (in synchronization with the high frequency input data) so that the phase tracker has more time in clock cycles before making a decision (e.g., to change a sampling position). However, there is much higher frequency noise due to high-speed operation and this noise may lead incorrect decisions in phase tracking. Thus, to prevent a phase tracker from moving its pointer based on a small number of (e.g., one or two) incorrect input data values caused by noise, it is conventional to use a low-pass filter. The different characteristics in different frequency ranges (of the input data) make it very difficult to implement a phase tracker with good performance at both input data frequency extremes.

For example, the system described in U.S. Pat. No. 5,905,769 performs 3× oversampling of a data signal having data period P, where P=1/(the data signal's bit rate). The phase tracker of this system operates on sample groups, each sample group including twelve samples indicative of four consecutive data periods (bits) of the data signal. Each sample group consists of a first subset of four samples having phase φ (i.e., the first, fourth, seventh, and tenth samples in the sample group), a second subset of four samples having phase (φ+120 degrees (i.e., the second, fifth, eighth, and eleventh samples in the sample group), and a third subset of four samples having phase φ+240 degrees (i.e., the third, sixth, ninth, and twelfth samples in the sample group). The phase tracker does not move its pointer (to change the sampling position to a new sampling position having increased phase) unless the samples of each of four consecutive sample groups indicate that the phase of the sampling clock (the sampling position) phase lags the center of the data eye, and does not move its pointer (to change the sampling position to a new sampling position having decreased phase) unless the samples of each of four consecutive sample groups (sampled during an interval having total duration equal to 16 data periods) indicate that the sampling clock phase leads the center of the data eye. The phase tracker thus implements a low-pass filter in the sense that it ignores phase difference between the sampling clock and data signal (and does not move its pointer) unless the sampling clock phase leads (or lags) the center of the data eye for not less than 16 consecutive data periods. The inventors have recognized that this low-pass filter can cause incorrect sampling position selection when the input data has relatively low frequency.

A second issue that complicates phase tracker design concerns dead cycles that can occur during pipelined processing. The expression "dead cycle" is used herein to denote a clock cycle, that occurs during pipelined processing of input data to select a best sampling position, in which the output of the pipeline is invalid due to lack of available feedback (where the feedback is needed to generate a valid output). For example, consider a pipelined phase tracker having four stages (stages 1, 2, 3, and 4), in which stage 1 selects information that will be used in stage 2 based on a current tracking pointer which identifies a best sampling position. In stages 2 and 3, more processing is performed on the output of stage 1. In stage 4, a new (updated) tracking pointer (which determines an updated best sampling position) is generated based on the output of stage 3, and the tracking pointer generated in stage 4 is fed back to stage 1. This kind of pipeline is conventionally used to implement a phase tracker that operates at high speed. However, due to the design and feedback path of this kind of pipeline, three dead cycles occur during operation of the pipeline. To understand this, assume that data A, B, C, D, and E are the first five quantities of data asserted sequentially to stage 1. At one point in time, a tracking pointer determined by data A has just been generated in stage 4, data determined by data B are in stage 3, data determined by data C are in stage 2, and data D are in stage 1. However, the data in stages 1, 2, and 3 are invalid at this time, because a tracking pointer (generated in stage 4 in response to input data) was not available in stage 1 when data A, B, C, and D were asserted to stage 1. No valid tracking pointer is available in stage 1 until the initial tracking pointer (generated in response to data A) is asserted to stage 1 for use in processing data E. Thus, the first three clock cycles (in which data B, C, and D were asserted to stage 1) after the initial clock cycle (in which data A were asserted to stage 1) are "dead cycles."

It is desirable to reduce the number of dead cycles that occur during operation of a pipelined phase tracker. Ideally, there will be zero dead cycles. However, due to the feedback loop (from the pointer adjustment step, or stage, to the data selection step, or stage) typically implemented in a phase tracker and the required high-speed clock frequency, it is not easy to remove stages of the pipeline to reduce the number of dead cycles to a value approaching zero (e.g., removal of pipeline stages of phase tracking circuitry to reduce the number of dead cycles results in an increased clock cycle time, which is typically unacceptable). Though it is possible to implement part or all of a phase tracker in a feed-forward manner rather than a feedback manner, this increases the hardware complexity significantly and also increases power consumption. Thus, there is a need for a phase tracker (of a feedback type) implemented to have a reduced number of dead cycles without increasing the clock cycle time.

A third issue that complicates phase tracker design arises when, as is typical, the phase tracker must operate in response to input data having a variable average number of transitions (per unit time). For example, during oversampling of TMDS-encoded data, the data are sometimes indicative of transition-minimized code words (i.e., when DE=1) and sometimes indicative of transition-maximized code words (i.e., when DE=0). A sequence of transition-maximized code words has a greater average number of transitions (per unit time) than a sequence of transition-minimized code words having the same bit rate. During oversampling of TMDS-encoded data, the phase tracker must correctly handle both transition-minimized code words (when DE=1) and transition-maximized code words (when DE=0). However, a problem arises because phase tracking uses and actually needs transitions to track the input correctly. If a phase tracker is designed to have maximized performance for transition-maximized input data (e.g., if the phase tracker changes its pointer to cause a change in sampling position only after examining samples from several consecutive input data periods), it may not perform well in response to transition minimized input data. On the other hand, if phase tracker performance is maximized for transition-minimized input data (e.g., if the phase tracker changes its pointer to cause a change in sampling position after examining samples from only one input data period or two consecutive input data periods), it may be too susceptible to possible noise in the input data. There is a need for a phase tracker that is implemented to handle input data of at least two different types, each type having a significantly different average number of transitions (per unit time). It is also possible that the optimum sample locations are different when the data has transition maximized edges than when the data has transition minimized edges due to the group velocity difference among different spectral components in the data. In that case, detecting the temporal density of transitions and having different default sample locations depending on the temporal density of transitions can provide better tracking.

Preferred embodiments of the present invention address all three above-noted issues.

SUMMARY OF THE INVENTION

In some embodiments, the invention is a data sampling circuit which employs an oversampling clock to oversample a data signal and which includes any embodiment of the inventive phase tracker. In other embodiments, the invention is a phase tracker for use with or in such a data sampling circuit.

In typical embodiments, the phase tracker of the invention sequentially processes sets of samples generated by oversampling a data signal. Each set consists of N samples of the data signal generated during a "tracking period" of the data signal. The tracking period has duration P*R*Q, where R is an integer (typically a small integer), Q=one data period=1/(the data signal's bit rate), and P samples are generated during each data period. For example, R=4 in typical 3× oversampling embodiments (in which P=3).

In a first class of embodiments, the inventive phase tracker is configured to generate relative phase data for each tracking period of a data signal being oversampled using an oversampling clock. The data signal can be indicative of data having variable bit rate. The relative phase data are data indicative of the phase of at least one sampling position of the oversampling clock relative to the center of the data eye (the optimal phase at which to sample the data signal, as defined above), for each tracking period. The phase tracker is also configured to determine the data signal's frequency range (a frequency range that contains the data signal's bit rate) and to apply a selected one of at least two types of low-pass filter (e.g., no low-pass filter or a first type of low-pass filter, or one of a first type and a second type of low-pass filter) to the relative phase data, where choice of the low-pass filter is determined by the frequency range of the data signal. For example, in some embodiments in this class, the phase tracker is operable in a first mode (in response to determining that the data signal has a frequency above a predetermined first threshold frequency) in which it applies a first low pass filter to the relative phase data and as a result, ignores phase misalignment between the oversampling clock and data signal (i.e., does not change its pointer signal, and thus does not cause a change in sampling position) unless it determines that the phase of the oversampling clock leads the phase of the data signal for N consecutive tracking periods (or lags the phase of the data signal for N consecutive tracking periods). The phase tracker is also operable in a second mode (in response to determining that the data signal has frequency below a predetermined second threshold frequency) in which it does not apply a low pass filter to relative phase data (and as a result, causes a change in sampling position in response to determining that the phase of the oversampling clock leads (or lags) the phase of the data signal during any one tracking period) or applies a different (less restrictive) low pass filter to the relative phase data (e.g., causes a change in sampling position only upon determining that the phase of the oversampling clock leads the phase of the data signal for M consecutive tracking periods, or lags the phase of the data signal for M consecutive tracking periods, where 2≦M, and M<N). The second threshold frequency is lower than the first threshold frequency. For example, the phase tracker can include a low pass filter having selectable number of taps, in response to determining that the data signal has frequency (i.e., bit rate) below the second threshold frequency, the phase tracker uses one tap or zero taps of the low pass filter (the pointer change decision is made based only on samples from the current tracking period and the previous tracking period, or on samples from the current tracking period only), and in response to determining that the data signal has frequency (i.e., bit rate) above the first threshold frequency, the phase tracker uses four or five taps of the low pass filter (the pointer change decision is made based on samples from four or five consecutive tracking periods). Circuitry for automatically controlling the type of low pass filtering applied to relative phase data (in response to determination of the frequency range of oversampled data) can be implemented in accordance with the invention using only a few additional logic gates than would be required to apply only one predetermined type of (non-controllable) low pass filtering to the relative phase data.

In preferred embodiments in the first class of embodiments, the phase tracker implements hysteresis. For example, it maintains the current type of low pass filtering in response to determining that the data signal's frequency has increased from a value less than the second threshold frequency to value greater than the second threshold frequency but less than the first threshold frequency, or has decreased from a value greater than the first threshold frequency to value less than the first threshold frequency but greater than the second threshold frequency.

In preferred embodiments in the first class, the phase tracker includes logic (sometimes referred to herein as "data frequency zone detection" logic) which compares a "data clock" (a clock whose frequency is proportional to, or otherwise indicative of, the bit rate of the oversampled data) to an internal clock having fixed, predetermined frequency. Typically, the data clock is (or is derived from) a clock that has been transmitted with the data signal (e.g., the data clock and data signal are transmitted over different channels of a multi-channel serial link). For example, both the oversampling clock and the data clock can be derived from a transmitted clock having frequency N/A, where A is an integer and N is the bit rate of the data, the oversampling clock has frequency (M*N), where M is a small integer, and the data clock has frequency equal to (M*N)/Z Hz, where Z is an integer. These integers can be time varying.

Typically, the data frequency zone detection logic includes a counter that counts cycles of the internal clock, a second counter that counts cycles of the data clock, and logic for generating a low pass filter control signal for the phase tracker in response to a count value indicative of the number of cycles of the data clock that occur during a predetermined number of cycles of the internal clock. In preferred implementations, the data frequency zone detection logic is operable properly even in the case that the second counter ceases to receive the data clock (e.g., the data frequency zone detection logic continues to update the value of the low pass filter control signal even if the externally supplied data clock becomes unavailable). In preferred implementations, the data frequency zone detection logic implements hysteresis in the sense that the low pass filter control signal causes the phase tracker to continue to apply the current type of low pass filtering when the data frequency zone detection logic determines that the frequency of the data clock has decreased from a value greater than a first (relatively high) threshold frequency to value less than the first threshold frequency but greater than a second (relatively low) threshold frequency, or has increased from a value less than the second threshold frequency to value greater than the second threshold frequency but less than the first threshold frequency. If hysteresis is not implemented, rapid fluctuation of the data clock frequency around a single (zone-determining) threshold frequency, could cause the frequency zone decision to change too frequently, so that the resulting changes in the low pass filter control signal occur so rapidly as to confuse the phase tracker and cause poor phase tracking performance.

In a second class of embodiments, the phase tracker of the invention implements a decision loop to generate sampling position control bits in response to sets of samples of a data signal, each of the sets of samples having been generated by oversampling the data signal during at least one tracking period. In such embodiments, the number of dead cycles is reduced by the way that the decision loop is implemented, to cause the decision loop to generate possible solutions (i.e., relative phase data for each sampling position) in parallel and select the correct solution (the best sampling position) at the latest practical stage. Thus, the decision loop's feedback point is moved (relative to the feedback point of the decision loop of a conventional phase tracker) so as to occur as late as practical. For example, consider the case that the decision loop performs five tasks (i.e., a, b, c, d, and e), the result of task 'e' (generation of sampling position control bits) is used in task 'a' (sampling of data at a sampling position determined by the sampling position control bits), and the result of task 'd' (generation of relative phase data) is used in task 'e'. In this example, instead of implementing the decision loop to have four dead cycles, all the possible outputs of the first four tasks ('a', 'b', 'c', and 'd') are calculated in parallel in accordance with the invention so that all possible solution candidates come to the input of task 'e,' and one of the solution candidates is selected in response to sampling position control bits generated by performing task 'e.' In this way, the number of dead cycles is reduced from four to zero. Although dead cycle reduction in accordance with the invention typically increases the area (on a chip) required to implement the phase tracker, it results in a significant performance improvement. Typically, dead cycles are reduced in accordance with the invention without removing any pipeline stage (i.e., without reducing the number of pipeline stages), so that overall cycle time is not changed.

In a third class of embodiments, the inventive phase tracker receives a sequence of sets of samples (sample sets) of a data signal, each sample set is indicative of (and generated by oversampling during) a different tracking period of the data signal. The phase tracker processes the sample sets to determine a best sampling position and update this determination as appropriate. The phase tracker is configured to enter a "no information" state upon determining that the current sample set indicates that the data signal has less than a predetermined number of transitions (e.g., less than one transition) during the corresponding tracking period. In the no information state, the phase tracker ignores the current sample set (i.e., considers no information derived from the current sample set) when updating its determination of the best sampling position. Rather, the phase tracker considers the next sample set, and either exits the no information state (and considers the next sample set when updating its determination of the best sampling position) if the next sample set indicates that the data signal has at least the predetermined number of transitions during the corresponding tracking period, or remains in the no information state (ignoring the next sample set when updating its determination of the best sampling position) if the next sample set indicates that the data signal has less than the predetermined number of transitions during the corresponding tracking period. In conventional phase trackers (e.g., that of U.S. Pat. No. 5,905,769), the pointer (determining the sampling position) is not changed in either of two cases: a first case in which the samples being processed indicate an insufficient number of transitions (in the corresponding data) to allow the phase tracker to determine a best sampling position based on these samples; and a second case in which the phase tracker determines from the samples being processed that the oversampling clock is aligned correctly with the corresponding portion of the data signal so that the pointer should not move. Occurrence of the first case (especially frequent occurrence of the first case, such as when the data signal being sampled is indicative of a sequence of transition minimized codes) can undesirably cause a conventional phase tracker not to adjust the pointer (in response to samples indicative of an insufficient number of transitions, e.g., no transitions) under circumstances which prevent the phase tracker from later adjusting the pointer when it should do so. As a result, conventional phase trackers cannot reliably perform phase tracking. By implementing a phase tracker in accordance with the invention to include a state machine that distinguishes between "no information" and "pointer hold" states, preferred embodiments of the inventive phase tracker avoid this problem. In preferred embodiments of the invention, the phase tracker decides to maintain the pointer unchanged (to "hold" the pointer so that it does not move) upon entering a "pointer hold" state (which occurs only when the samples being processed are indicative of a sufficient number of transitions of the data, and indicate that the data signal is aligned correctly with the oversampling clock), but skips a cycle in its process of deciding whether to move or hold the pointer upon entering a "no information" state since in this state the phase tracker cannot determine whether the pointer is correct or not from the current set of samples being processed. Implementation of distinct "no information" and "pointer hold" states can have a significant effect on performance, especially when a phase tracker implements low pass filtering.

Some embodiments of the invention belong to two (or all three) of the above-noted classes of embodiments. For example, some embodiments are adaptive (in the sense that the "best" sampling positions selected thereby depend on the frequency and number of transitions of the data signal to be oversampled) and also accomplish sampling position selection with few dead cycles. For another example, some embodiments are adaptive in the sense that the "best" sampling positions selected thereby depend on the frequency (or number of transitions) of the data signal to be oversampled, and they also accomplish sampling position selection with few dead cycles. For another example, some embodiments accomplish sampling position selection with few dead cycles but are not adaptive.

It is contemplated that many embodiments of the invention can be implemented to accomplish oversampling of data signals that are indicative of TMDS-encoded data, and/or phase tracking in support of oversampling of such data signals.

Another aspect of the invention is a receiver that includes any embodiment of the inventive phase tracking (or data sampling) circuit.

Another aspect of the invention is a method for identifying a sequence of best sampling positions for sampling a data signal having a data eye and a variable bit rate, from samples of the data signal generated using an oversampling clock having sampling positions, where the data eye has a center. The method includes the steps of: (a) generating, from the samples, relative phase data indicative of phase of at least one of the sampling positions relative to the center of the data eye, for each of a number of tracking periods of the data signal; and (b) determining from the relative phase data which of the sampling positions is best aligned with the center of the data eye during each of at least some of the tracking periods, thereby identifying the sequence of best sampling positions. Step (b) includes the steps of: (c) applying a first low-pass filter to the relative phase data for at least one of the tracking periods in response to determining that the data signal's bit rate is in a first frequency range; and (d) applying one of a second low-pass filter and no low-pass filter to the relative phase data for at least another one of the tracking periods in response to determining that the data signal's bit rate is in a second frequency range, where the second frequency range is different than the first frequency range and the second low-pass filter is different than the first low-pass filter. Typically, the first low-pass filter prevents a change in the most recently identified best sampling position unless the relative phase data indicate that the phase of a sampling position of the oversampling clock leads the center of the data eye for N consecutive tracking periods (or lags the center of the data eye for N consecutive tracking periods). In typical cases in which the second low-pass filter is applied in step (c), the method causes a change in sampling position during application of the second low-pass filter only in response to determination that the phase of a sampling position of the oversampling clock leads the center of the data eye for M consecutive tracking periods, or lags the center of the data eye for M consecutive tracking periods, where $2 \leq M$, and M<N (where the first low-pass filter prevents a change in the sampling position unless the relative phase data indicates that the phase of a sampling position of the oversampling clock leads the center of the data eye for N consecutive tracking periods or lags the center of the data eye for N consecutive tracking periods). In typical cases in which no low-pass filter is applied in step (c), the method causes a change in sampling position in response to a determination that the phase of a sampling position of the oversampling clock leads (or lags) the center of the data eye during any one tracking period. In some embodiments, the method includes the step of determining whether the data signal's bit rate is in the first frequency range by generating a count indicative of the number of cycles of a data clock that occur during a predetermined number of cycles of a second clock, and determining that the data signal's bit rate is in the first frequency range only if the count exceeds a predetermined threshold, where the data clock has frequency indicative of the data signal's bit rate and the second clock has a fixed, predetermined frequency.

Preferred embodiments of the methods described in the previous paragraph implement hysteresis. For example, in some such preferred embodiments, the second frequency range is distinct from (and lower than) the first frequency range, and the second frequency range is separated from the first frequency range by a third frequency range. In these embodiments, after application of the first low-pass filter has begun, application of the first low-pass filter continues in response to a determination that the data signal's bit rate has decreased from a value in the first frequency range to a value in the third frequency range but above the second frequency range, and after application of the first low-pass filter has ceased, the first low-pass filter is not applied again in response to a determination that the data signal's bit rate has increased from a value in the second frequency range to a value in the third frequency range but below the first frequency range.

Another aspect of the invention is a method for selecting samples of a data signal having a data eye, where the data eye has a center and the samples have been generated by oversampling the data signal using an oversampling clock, said method including the steps of:

(a) generating sampling position control data in response to relative phase data, where the relative phase data are indicative of phase of a selected sampling position of the oversampling clock relative to the center of the data eye during at least one tracking period of said data signal;

(b) generating additional relative phase data, wherein the additional relative phase data are indicative of phase of each of multiple sampling positions of the oversampling clock relative to the center of the data eye during a subsequent tracking period of said data signal;

(c) after step (b), selecting a subset of a set of the samples in response to the sampling position control data, said set of the samples having been generated by oversampling the data signal during the subsequent tracking period, and said subset of the set of the samples having been generated at the selected sampling position, and selecting a subset of the additional relative phase data in response to the sampling position control data, said subset of the additional relative phase data being indicative of the phase of the selected sampling position relative to the center of the data eye during the subsequent tracking period of said data signal; and (d) after step (c), generating updated sampling position control data in response to the additional relative phase data selected during step (c).

Another aspect of the invention is a method for selecting samples of a data signal having a data eye, where the data eye has a center and the samples have been generated by oversampling the data signal using an oversampling clock, said method including the steps of:

(a) generating sampling position control data in response to relative phase data, where the relative phase data are indicative of phase of a selected sampling position of the oversampling clock relative to the center of the data eye during at least one tracking period of said data signal;

(b) generating additional relative phase data, wherein the additional relative phase data are indicative of phase of each of multiple sampling positions of the oversampling clock relative to the center of the data eye during a subsequent tracking period of said data signal;

(c) after step (b), selecting a subset of a set of the samples in response to the sampling position control data, said set of the samples having been generated by oversampling the data signal during one tracking period of said at least one tracking period, and said subset of the set of the samples having been generated at the selected sampling position, and selecting a subset of the additional relative phase data in response to the sampling position control data, said subset of the additional relative phase data being indicative of the phase of the selected sampling position relative to the center of the data eye during the subsequent tracking period of said data signal; and (d) after step (c), generating updated sampling position control data in response to the additional relative phase data selected during step (c).

Some embodiments of the method of either of the two previous paragraphs implement low-pass filtering. In such embodiments, the relative phase data employed in step (a) to generate the sampling position control data are indicative of the phase of the selected sampling position of the oversampling clock relative to the center of the data eye during each of at least two consecutive tracking periods of said data signal, and the subset of the additional relative phase data employed in step (d) (to generate the updated sampling position control data) is indicative of the phase of the selected sampling position of the oversampling clock relative to the center of the data eye during each of at least two consecutive tracking periods of said data signal including the subsequent tracking period.

Another aspect of the invention is a method for identifying a sequence of selected sampling positions for sampling a data signal by processing a sequence of sample sets, where each of the sample sets consists of samples of the data signal that have been generated by oversampling said data signal during a different tracking period, said method including the steps of: for each of the sample sets, determining whether said each of the sample sets indicates that the data signal has less than a predetermined number of transitions during the tracking period in which said each of the sample sets was generated; and identifying the sequence of selected sampling positions by processing the sequence of sample sets, including by selecting a different sampling position to replace a previously selected sampling position only in response to each of the sample sets that indicates that the data signal has at least the predetermined number of transitions during the tracking period in which said each of the sample sets was generated, but not in response to any of the sample sets that indicates that the data signal has less than the predetermined number of transitions during the tracking period in which said any of the sample sets was generated.

DETAILED DESCRIPTION OF PREFERRED EMBODIMENTS

Throughout this disclosure, the symbol "^" denotes the bitwise exclusive OR (XOR) operation, the symbol "|" denotes the bitwise nonexclusive OR operation, the symbol "~" denotes the bitwise negation operation (e.g., the four-bit sequence "x"=0010 satisfies x=~y, where "y"=1101), and the symbol "&" denotes the logical AND operation.

Figure 1:
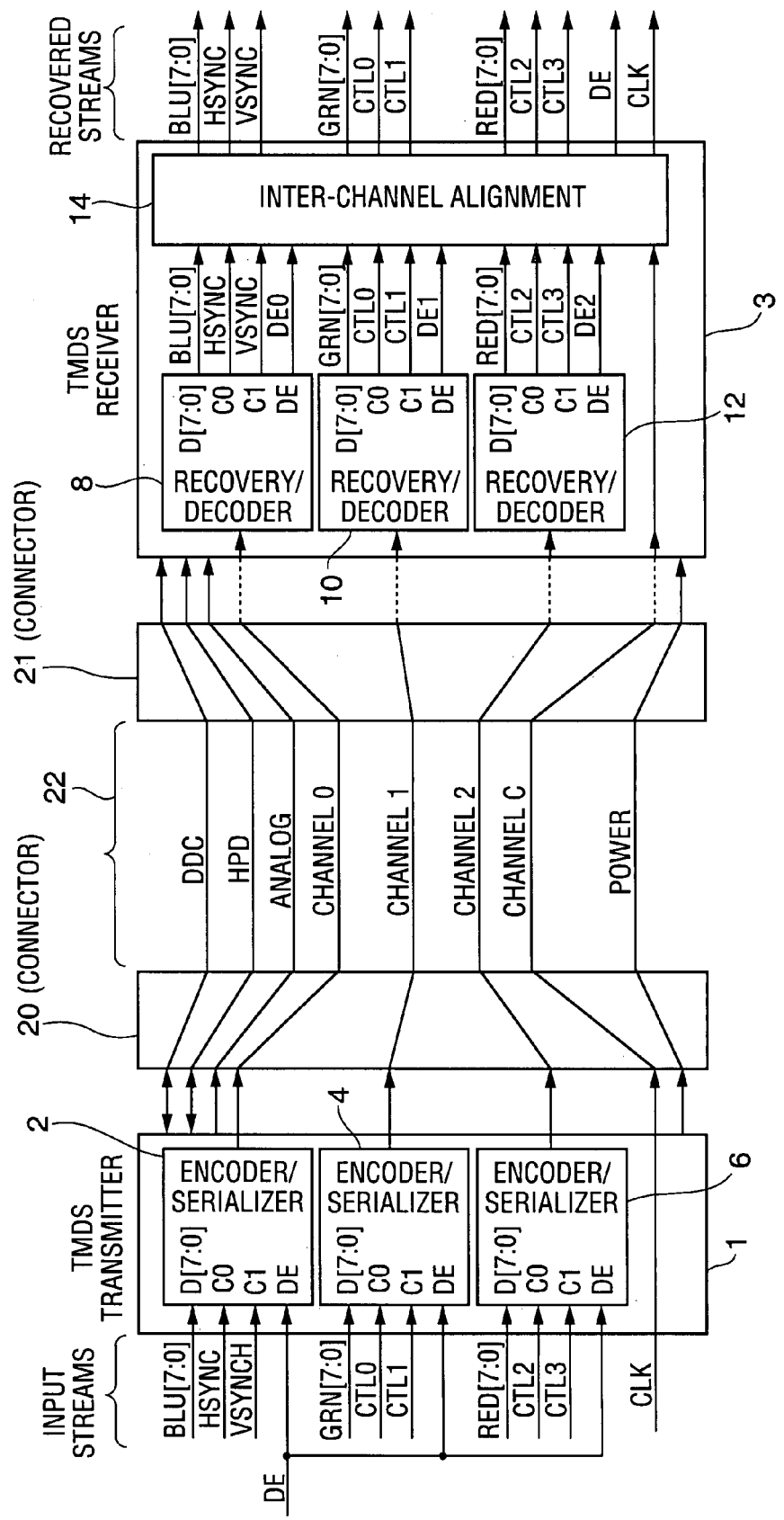
FIG. 1 is a block diagram of a conventional system for transmitting a data signal (indicative of encoded data) over a serial link and oversampling the received data signal.
Figure 2:
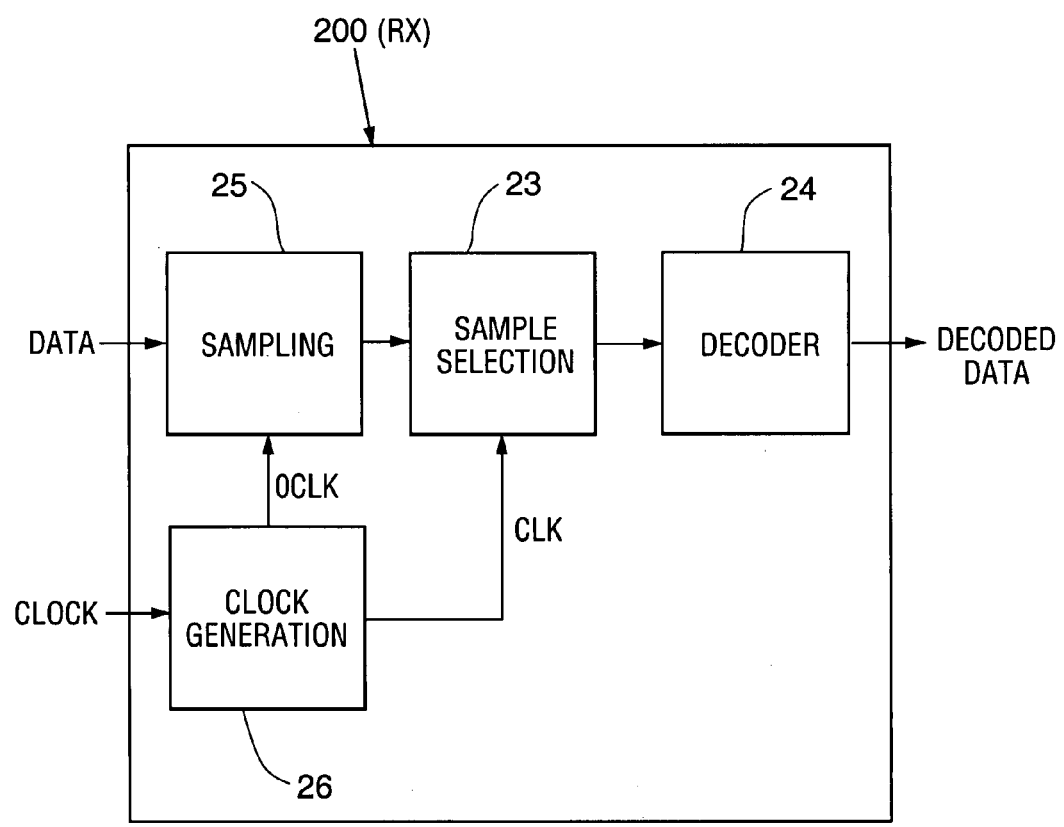
FIG. 2 is a block diagram of a receiver that can be implemented to embody the invention.

Receiver 200 of FIG. 2 is configured to oversample a data signal ("DATA") that has propagated to it over a serial link. The data signal has a bit rate equal to N bits per second. Receiver 200 also receives a clock signal ("CLOCK") that has propagated over the serial link, and includes clock generation circuit 26 which is configured to generate an oversampling clock "OCLK" (having frequency M*N Hz, where M is a small integer) in response to the clock signal CLOCK. Clock generation circuit 26 is also configured to generate the clock signal "CLK" employed by sample selection circuitry 23. Typically, the clock signal "CLK" has frequency equal to (M*N)/Z Hz, where Z is an integer greater than 2. For example, Z=12 in some embodiments.

Receiver 200 also includes data sampling circuit 25 which is coupled to receive the data signal DATA and the oversampling clock OCLK. In the case that M=3, circuit 25 is configured to generate three sequences of samples of the data signal: one sequence having a first sampling position; another sequence having a second sampling position; and a third sequence having a third sampling position. In this case, circuit 25 generates three samples (each at a different sampling position) during each data period of the data signal.

In a typical implementation, the data signal DATA is received over one channel of a TMDS link, and is indicative of a sequence of 10-bit TMDS-encoded characters. In this case, circuit 25 can operate (using 3× oversampling) to generate a sequence of sample sets, each set consisting of twelve samples indicative of four bits of a sequence of TMDS-encoded characters.

Sample selection circuitry 23 receives each set of samples produced by circuit 25 (e.g., each set of twelve samples) and selects a subset of each sample set. In a typical implementation in which the data signal DATA is indicative of a sequence of 10-bit TMDS-encoded characters, circuit 25 sequentially generates twelve-sample sets of the data signal and circuitry 23 selects four samples (all having the same sampling position, which circuitry 23 determines to be the "best" sampling position) from each twelve-sample set.

The samples selected by circuitry 23 are asserted to decoder 24 which decodes them, thereby generating decoded data (identified as "Decoded Data" in FIG. 2). In an implementation in which the data signal is indicative of a sequence of 10-bit TMDS-encoded characters, and in which circuitry 23 selects four samples from each set of twelve samples received from circuit 25, the Decoded Data generated by decoder 24 are indicative of a sequence of decoded versions of the TMDS-encoded characters (each of which can be an 8-bit data word, or can be sync or control word bits).

To allow circuit 25 to perform 3× oversampling (in which case M=3), the oversampling clock ("OCLK") generated by circuit 26 of FIG. 2 can have three sets of sampling edges, with a phase difference of ±120 degrees between each two sets. Each of the three sets of sampling edges has a different "sampling position."

Since real implementations of receiver 200 are subject to data and clock jitter, the actual relative phase of the oversampling clock edges and the edges of the data signal are not known and can change either rapidly or slowly.

Figure 3:
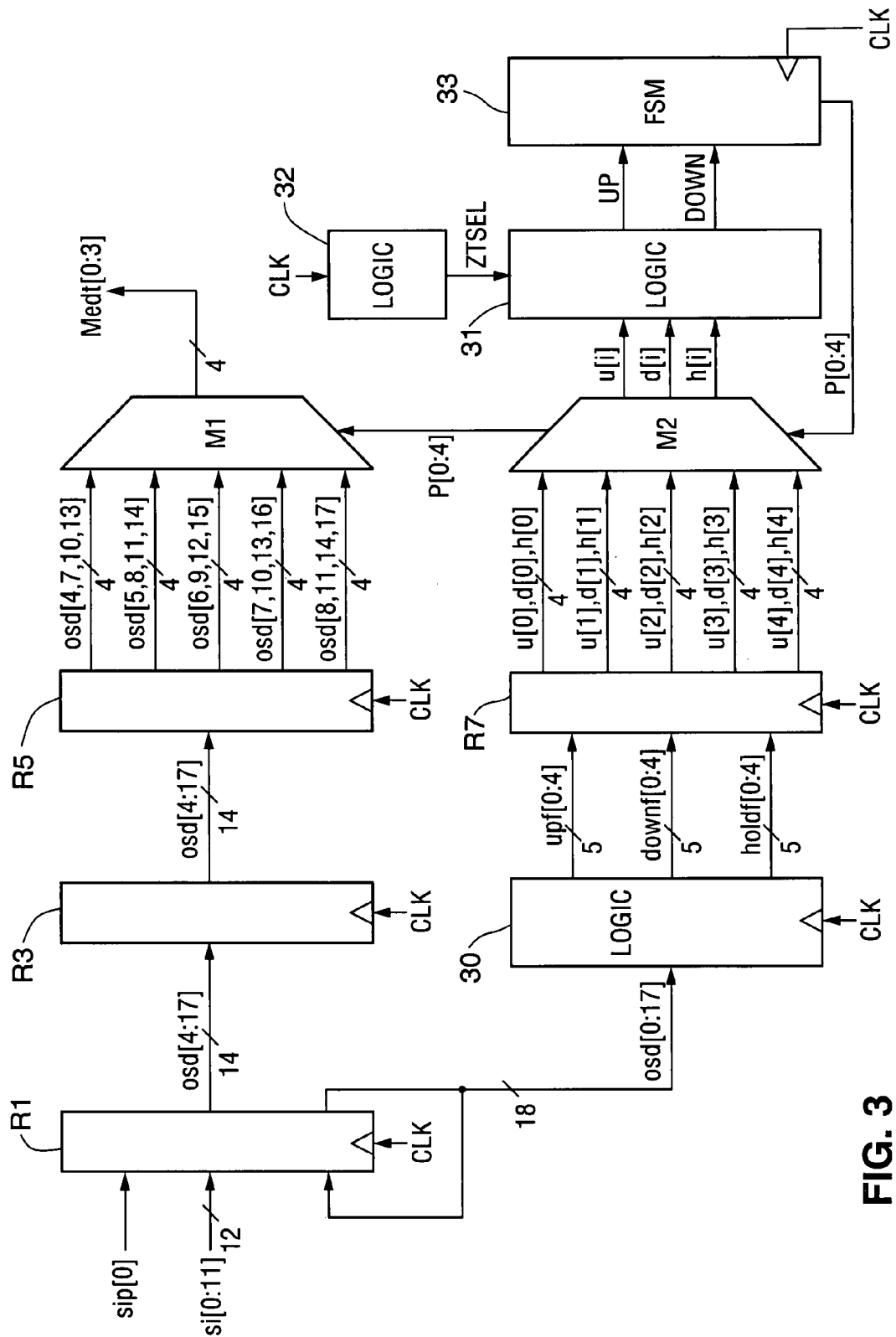
FIG. 3 is a block diagram of a first embodiment of the inventive sample selection circuitry, which can be used to implement sample selection circuit 23 of FIG. 2. The sample selection circuitry of FIG. 3 determines a sampling position for 3× oversampling of a data signal (received after transmission over a serial link).

FIG. 3 is a block diagram of sample selection circuitry that embodies the invention. The FIG. 3 circuitry can be used to implement sample selection circuit 23 of receiver 200 of FIG. 2, and is capable of determining a sampling position for 3× oversampling of a data signal received after transmission over a serial link (e.g., by receiver 200) and selecting one sample of each three consecutive samples of the data signal.

In FIG. 3, register R1 is coupled to receive the current set of twelve samples, si[0:11], and the first sample (sip[0]) of the next set of twelve samples (sample sip[0] is subjected to less delay than is the current set of samples before assertion to register R1). Register R1 is configured to output a sequence of 18-bit words, osd[0:17], whose most significant bit, osd[17], is the current value of sip[0]. The bits osd[5:16] of the current word osd[0:17] satisfy osd[5:16]=si[0:1], and the five least-significant bits (osd[0:4]) are the last five samples (si[7:11]) of the previous set of twelve samples (which are samples osd[12:16] of the previous word osd[0:17] output from register R1). Register R1 outputs a new word osd[0:17] during each cycle of clock CLK, which has frequency equal to F/12, where F is the frequency of the oversampling clock employed to generate the samples.

In response to each word osd[0:17], logic circuitry 30 generates (and asserts to register R7) bits upf[0:4], downf[0:4], and holdf[0:4], which are indicative of the alignment of the oversampling clock (clock OCLK of FIG. 2) relative to the data signal (DATA). A new set of the bits upf[0:4], downf[0:4], and holdf[0:4] is clocked out of register R7 to multiplexer M2 once per cycle of clock CLK. Register R7 and multiplexer M2 are coupled and configured so that multiplexer M2 selects (and asserts to logic 2) either the three-bit set upf[0], downf[0], and holdf[0] (labeled as "u[0], d[0], h[0]" in FIG. 3 for convenience), the three-bit set upf[1], downf[1], and holdf[1] (labeled as "u[1], d[1], h[1]" in FIG. 3), the three-bit set upf[2], downf[2], and holdf[2] (labeled as "u[2], d[2], h[2]" in FIG. 3), the three-bit set upf[3], downf[3], and holdf[3] (labeled as "u[3], d[3], h[3]" in FIG. 3), or the three-bit set upf[4], downf[4], and holdf[4] (labeled as "u[4], d[4], h[4]" in FIG. 3). The three bits selected by multiplexer M2 are labeled as u[i], d[i], and h[i] in FIG. 3, for convenience, where index "i" can be 0, 1, 2, 3, or 4, depending on the value of multiplexer control bits P[0:4].

The bits osd[4:17] of each word osd[0:17] output from register R1 are asserted to register R3, and are clocked out of register R3 to register R5 in response to clock signal CLK, so that they arrive at register R5 in the same clock cycle as do the bits upf[0:4], downf[0:4], and holdf[0:4] generated in response to the same word osd[0:17]. Bits osd[4:17] of each word osd[0:17] are clocked out of register R5 to multiplexer M1 in response to clock signal CLK so that they arrive at multiplexer M1 in the same clock cycle as do the bits upf[0:4], downf[0:4], and holdf[0:4] generated in response to the same word osd[0:17].

In variations on the described implementation of FIG. 3, samples propagate through a first branch of the inventive phase tracking circuitry (e.g., a branch including registers R3 and R5 of FIG. 3, or at least one other register that replaces registers R3 and R5) and arrive at a first multiplexer at the last stage of the first branch (e.g., at multiplexer M1 or another multiplexer that replaces multiplexer M1) during one clock cycle, and relative phase bits (e.g., bits upf[0:4], downf[0:4], and holdf[0:4], or substitutes for such bits) generated in response to the same samples propagate through a second branch of the phase tracking circuitry (e.g., a branch including logic 30 and register R7 of FIG. 3, or other circuitry replacing elements 30 and R7) and arrive at a second multiplexer at the last stage of the second branch (e.g., at multiplexer M2 or another multiplexer replacing multiplexer M2) during a different clock cycle. Thus, the relative phase bits selected by the second multiplexer (during one clock cycle) need not have been derived from the same set of samples from which a sample subset is selected by the first multiplexer (during the same clock cycle).

Logic circuitry 31, logic circuitry 32, and finite state machine 33 generate multiplexer control bits P[0:4] in response to the bits upf[0:4], downf[0:4], and holdf[0:4], in a manner to be described with reference to FIGS. 4, 5, and 6. In response to control bits P[0:4], multiplexer M1 passes through a selected subset of the bits of the current word osd[0:17]: either the bits osd[4], osd[7], osd[10], and osd[13]; the bits osd[5], osd[8], osd[11], and osd[14]; the bits osd[6], osd[9], osd[12], and osd[15]; the bits osd[7], osd[10], osd[13], and osd[16]; or the bits osd[8], osd[11], osd[14], and osd[17]. Each 4-bit output word selected by multiplexer M1 is labeled "Medt[0:3]" in FIG. 3, and is indicative of four samples of the data signal taken at a selected sampling position. Typically, a sequence of the output words Medt[0:3] is asserted to a decoder (e.g., to decoder 24 of FIG. 2).

We next describe the manner in which the FIG. 3 circuit generates control bits P[0:4], with reference to FIGS. 3, 4, 5, and 6.

In response to each word osd[0:17] from register R1, logic circuitry 30 (of FIG. 3) generates bits upf[0:4], downf[0:4], and holdf[0:4], which are indicative of the alignment of the oversampling clock (clock OCLK of FIG. 2) relative to the oversampled data signal. FIG. 4 is a block diagram of an implementation of logic circuitry 30.

Figure 4:
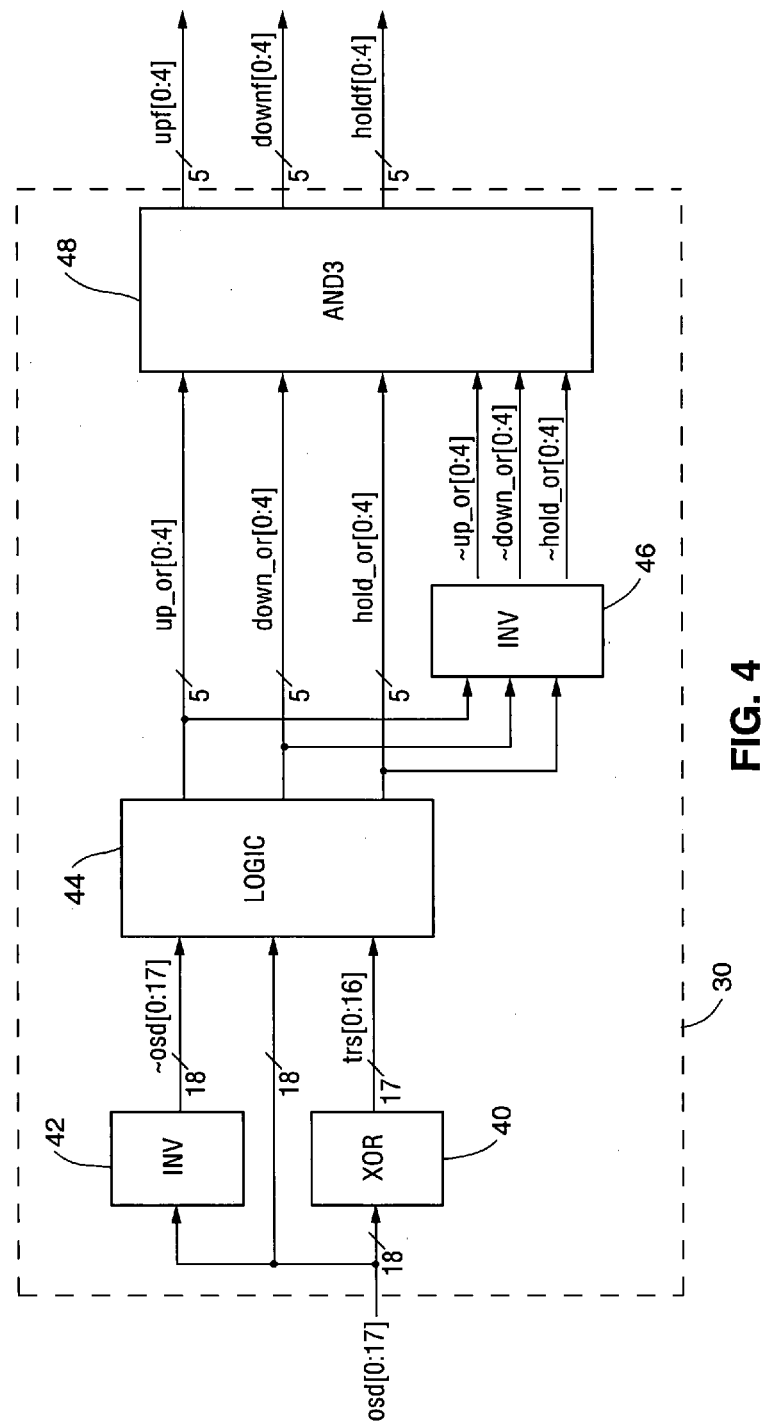
FIG. 4 is a block diagram of one implementation of logic circuitry 30 of FIG. 3.

In the FIG. 4 implementation of logic circuitry 30, XOR circuit 40 generates seventeen transition bits "trs[0:16]" in response to each 18-bit word osd[0:17] and inverter 42 generates the complement (~osd[0:17]) of each word osd[0:17]. Specifically, circuit 40 is configured such that the "i"th transition bit, trs[i], satisfies trs[i]=osd[i]^osd[i+1], where "^" denotes the exclusive OR operation, and osd[i] is the "i"th bit of the word osd[0:17]. Logic circuitry 44 is coupled to receive the current word osd[0:17], its complement ~osd[0:17], and the transition bits trs[0:16], and is configured to generate the words up_or[0:4], down_or[0:4], and hold_or[0:4], in response thereto.

Logic circuitry 44 includes logic elements configured to generate bits "up[0:13]" (each bit of which is indicative of whether the phase of a different portion of the data signal, from which a set of three consecutive samples of word osd[0:17] is taken, leads the oversampling clock phase), down[0:13] (each bit of which is indicative of whether the phase of a different portion of the data signal, from which a set of three consecutive samples of word osd[0:17] is taken, lags the oversampling clock phase), and hold[0:13] (each bit of which is indicative of whether the oversampling clock phase is aligned with that of a different portion of the data signal) in response to bits of the words ~osd[0:17], osd[0:17], and trs[0:16]. Specifically:

up[i], the "i"th bit of up[0:13], satisfies up[i]=1 if trs[i+3]=0 and trs[i+2]=1, and up[i]=0 if trs[i+3]=1 or trs[i+2]=0;

down[i], the "i"th bit of down[0:13], satisfies down[i]=1 if trs[i+3]=1 and trs[i+2]=0, and up[i]=0 if trs[i+3]=0 or trs[i+2]=1; and hold[i], the "i"th bit of hold[0:13], satisfies hold[i]=~(osd[i+1]^osd[i+3]) & (trs[i]|trs[i+3]). Thus, hold[i]=1 when osd[i+1]=osd[i+3], and there is at least one transition at either side of the sequence of data values osd[+1], osd[i+2], osd[i+3].

Logic circuitry 44 also includes circuitry for delaying the bits up[0:13] by one cycle of the clock signal CLK to generate the bits up_d[0:13], for delaying the bits down[0:13] by the same amount to generate the bits down_d[0:13], and for delaying the bits hold[0:13] by the same amount to generate the bits hold_d[0:13]. This delay matches that applied to the samples osd[4:17] by register R3 of FIG. 3.

Logic circuitry 44 also includes logic circuitry configured to generate bits "up_or[0:4]" in response to the bits up_d [0:13], for generating bits "down_or[0:4]" in response to the bits down_d[0:13], and for generating bits "hold_or[0:4]" in response to the bits hold_d[0:13], such that:

up_or[i]=up_d[i]|up_d[i+3]|up_d[i+6]|up_d[i+9];
down_or[i]=down_d[i]|down_d[i+3]|down_d[i+6] |down_d[i+9]; and
hold_or[i]=hold_d[i]|hold_d[i+3]|hold_d[i+6]|hold_d[i+ 9].

Inverter circuitry 46 generates the complement ~up_or[0: 4] of each word "up_or[0:4],"the complement ~down_or[0: 4] of each word "down_or[0:4]," and the complement ~hold_or[0:4] of each word "hold_or[0:4]."

Logic circuitry 48 is coupled to receive the words ~up_or [0:4], up_or[0:4], ~down_or[0:4], down_or[0:4], ~hold_or [0:4], and hold_or[0:4], and configured to "AND" together three-bit subsets thereof to generate the words upf[0:4], downf[0:4], and holdf[0:4]. Specifically:

upf[0:4]=up_or[0:4] & ~down_or[0:4] & ~hold_or[0:4];
downf[0:4]=~up_or[0:4] & down_or[0:4] & ~hold_or[0: 4]; and
holdf[0:4]=~up_or[0:4] & ~down_or[0:4] & ~hold_or[0: 4].

As explained above, the bits upf[0:4], downf[0:4], and holdf[0:4] are asserted to register R7, and are clocked out of register R7 to multiplexer M2. Multiplexer M2 selects (and asserts to "OR3" logic circuitry 50, 51, and 52 of logic 31, as shown in FIG. 5) the three-bit set upf[i], downf[i], and holdf[i] (labeled as "u[i], d[i], h[i]" in FIGS. 3 and 5 for convenience), where the index "i" is 0, 1, 2, 3, or 4, depending on the value of multiplexer control bits P[0:4].

Figure 5:
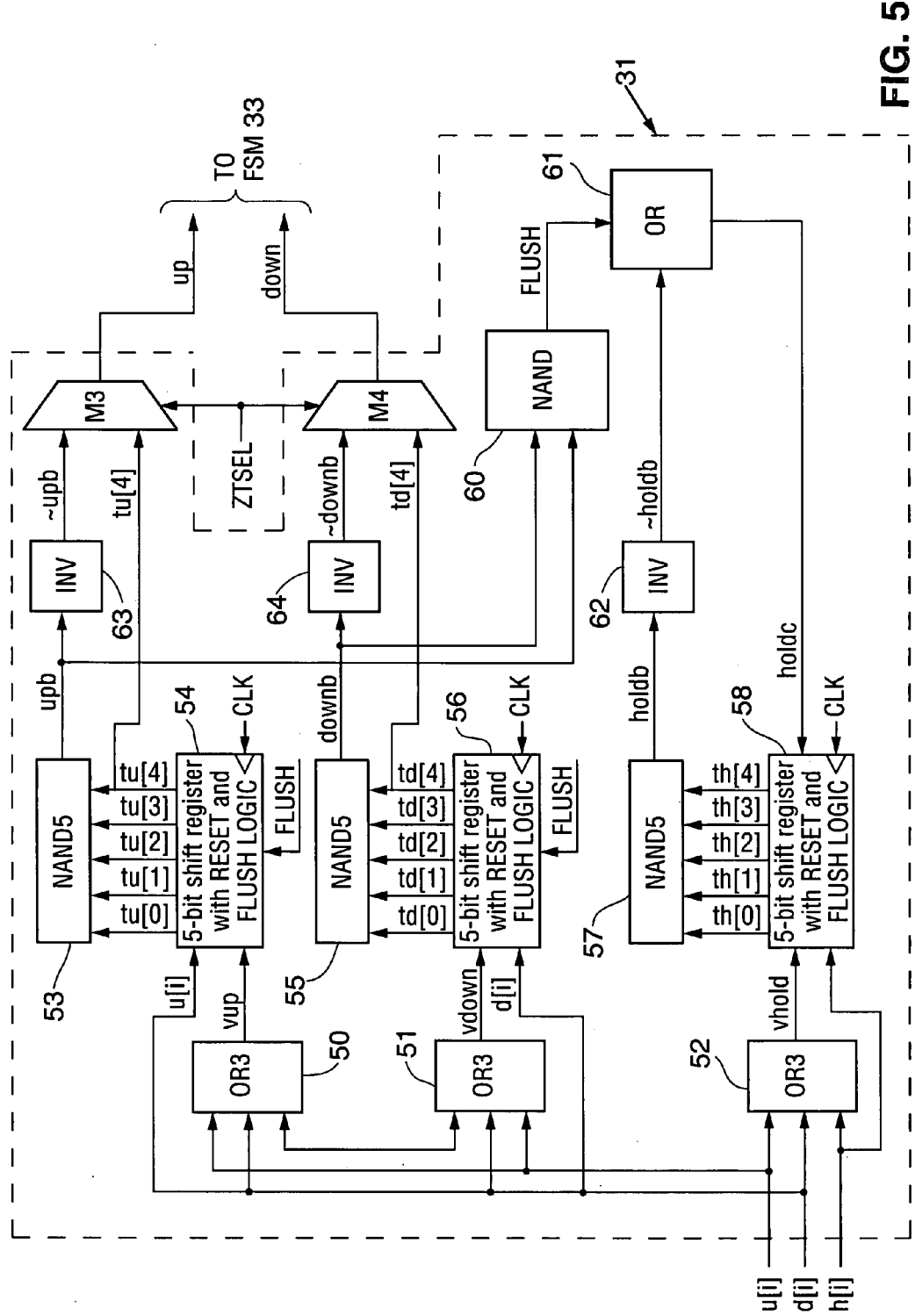
FIG. 5 is a block diagram of one implementation of logic circuitry 31 of FIG. 3.

In the FIG. 5 implementation of logic 31, OR3 circuit 50 generates bit "vup" in response to bits u[i], d[i], and "holdc," OR3 circuit 51 generates bit "vdown" in response to bits u[i], d[i], and holdc, and OR3 circuit 52 generates bit "vhold" in response to bits u[i], d[i], and h[i]. Bit "holdc" is generated by OR gate 61 in a manner to be described below. The bits vup, vdown, and vhold satisfy:

vup=u[i]|d[i]|holdc;
vdown=d[i]|u[i]|holdc; and
vhold=h[i]|u[i]|d[i].

The bits vup and vdown satisfy vdown=vup=0 only in a "no information" state in which none of the bits u[i], d[i], and holdc indicates that the phase of the data signal (from which the samples osd[0:17] are taken) lags, leads, or matches the oversampling clock phase, so that the samples osd[0:17] reveal no information about the relative phase of the data signal and oversampling clock. Similarly, "vhold"=0 only in a "no information" state in which none of the bits u[i], d[i], and h[i] indicates that the phase of the data signal lags, leads, or matches the oversampling clock phase, so that the samples osd[0:17] reveal no information about the relative phase of the data signal and oversampling clock.

In one operating mode, the FIG. 5 circuit low pass filters the bits u[i], d[i], and h[i] (or substitutes therefor) using 5-bit shift registers (in circuits 54, 56, and 58) and NAND5 circuits 53, 55, and 57. In this mode, the output of circuit 53 (identified as the bit "upb") is the result of "NANDing" together the contents (a set of five bits tu[0:4]) of the 5-bit shift register in circuit 54. The bits tu[0:4] are typically a sequence of five consecutively values of u[i], received during five consecutive cycles of clock CLK, although they can include substitutes for all or some of the values u[i] that are generated as a result of flushing or resetting operations (to be described below). In the same mode, the output of circuit 55 (identified as the bit "downb") is the result of "NANDing" together the contents (a set of five bits td[0:4]) of the 5-bit shift register in circuit 56. The bits td[0:4] are typically a sequence of five consecutively values of d[i], received during five consecutive cycles of clock CLK, although they can include substitutes for all or some of the values d[i] that are generated as a result of flushing or resetting operations (to be described below). Also in the same mode, the output of circuit 57 (identified as the bit "holdb") is the result of "NANDing" together the contents (a set of five bits th[0:4]) of the 5-bit shift register in circuit 58. The bits th[0:4] are typically a sequence of five consecu- tively values of h[i], received during five consecutive cycles of clock CLK, although they can include substitutes for all or some of the values h[i] that are generated as a result of flushing or resetting operations (to be described below).

More specifically, circuit 54 can operate to shift the current "u[i]" bit into the shift register therein (as the bit "tu[4]") and to shift this bit through the register so that the "u[i]" bit replaces the previous "tu[3]" bit (in the register) on the next clock cycle after the u[i] bit enters the register, replaces the previous "tu[2]" bit (in the register) on the second clock cycle after the u[i] bit enters the register, replaces the previous "tu[1]" bit (in the register) on the third clock cycle after the u[i] bit enters the register, and replaces the previous "tu[0]" bit (in the register) on the fourth clock cycle after the u[i] bit enters the register. However, circuit 54 includes logic for substituting different bits for the bits shifted in to the register, under circumstances to be explained next. When the bit "flush" satisfies flush=0 and the bit "vup" satisfies vup=1, the current up[i] bit received by circuit 54 is shifted into the register as bit "tu[4]," the previous tu[4] bit becomes the new tu[3] bit in the register, the previous tu[3] bit becomes the new tu[2] bit in the register, the previous tu[2] bit becomes the new tu[1] bit in the register, and the previous tu[1] bit becomes the new tu[0] bit in the register. But if vup=0 and flush=0, the previous "tu[4]" bit (the bit shifted into the register on the previous cycle) becomes the new "tu[4]" bit, the previous tu[3] bit becomes the new tu[3] bit in the register, the previous tu[2] bit becomes the new tu[2] bit in the register, the previous tu[1] bit becomes the new tu[1] bit in the register, and the previous tu[0] bit becomes the new tu[0] bit in the register. Because vup=0 indicates that the system is in the above- mentioned "no information" state, the system ignores the current value of u[i] in the "no information" state and the contents of the register remain unchanged. When the "flush" bit satisfies flush=1, all the register bits are flushed to zero (i.e., tu[4] is forced to the value tu[4]=0, tu[3] is forced to the value tu[3]=0, tu[2] is forced to the value tu[2]=0, tu[1] is forced to the value tu[1]=0, and tu[0] is forced to the value tu[0]=0). As will be explained below with reference to NAND gate 60, flush=1 when one of the output bits ("up" or "down") asserted to FSM 33 goes high to indicate that the sampling position should be changed. Thus, the contents of the shift register in circuit 54 are "flushed" to zero each time the sampling position is to be changed.

Similarly, circuit 56 can operate to shift the current "d[i]" bit into the shift register therein (as the bit "td[4]") and to shift this bit through the register so that the "d[i]" bit replaces the previous "td[3]" bit (in the register) on the next clock cycle after the d[i] bit enters the register, replaces the previous "td[2]" bit (in the register) on the second clock cycle after the d[i] bit enters the register, replaces the previous "td[1]" bit (in the register) on the third clock cycle after the d[i] bit enters the register, and replaces the previous "td[0]" bit (in the register) on the fourth clock cycle after the d[i] bit enters the register. However, circuit 56 includes logic for substituting different bits for the bits shifted in to the register, under the following circumstances. When the bit "flush" satisfies flush=0 and the bit "vdown" satisfies vdown=1, the current d[i] bit received by circuit 56 is shifted into the register as bit "td[4]," the previous td[4] bit becomes the new td[3] bit in the register, the previous td[3] bit becomes the new td[2] bit in the register, the previous td[2] bit becomes the new td[1] bit in the register, and the previous td[1] bit becomes the new td[0] bit in the register. If vdown=0 and flush=0, the previous "td[4]" bit (the bit shifted into the register on the previous cycle) becomes the new "td[4]" bit, the previous td[3] bit becomes the new td[3] bit in the register, the previous td[2] bit becomes the new td[2] bit in the register, the previous td[1] bit becomes the new td[1] bit in the register, and the previous td[0] bit becomes the new td[0] bit in the register. Because vdown=0 indicates that the system is in the above-mentioned "no information" state, the system ignores the current value of d[i] in the "no information" state and the contents of the register remain unchanged. When the "flush" bit satisfies flush=1, all the register bits are flushed to zero (i.e., td[4] is forced to the value td[4]=0, td[3] is forced to the value td[3]=0, td[2] is forced to the value td[2]=0, td[1] is forced to the value td[1]=0, and td[0] is forced to the value td[0]=0). As will be explained below with reference to NAND gate 60, flush=1 when one of the output bits ("up" or "down") asserted to FSM 33 goes high to indicate that the sampling position should be changed. Thus, the contents of the shift register in circuit 56 are "flushed" to zero each time the sampling position is to be changed.

Similarly, circuit 58 can operate to shift the current "h[i]" bit into the shift register therein (as the bit "th[4]") and to shift this bit through the register so that the "h[i]" bit replaces the previous "th[3]" bit (in the register) on the next clock cycle after the h[i] bit enters the register, replaces the previous "th[2]" bit (in the register) on the second clock cycle after the h[i] bit enters the register, replaces the previous "th[1]" bit (in the register) on the third clock cycle after the h[i] bit enters the register, and replaces the previous "th[0]" bit (in the register) on the fourth clock cycle after the h[i] bit enters the register. However, circuit 58 includes logic for substituting different bits for the bits shifted in to the register, under the following circumstances. When the bit "holdc" satisfies holdc=0 and the bit "vhold" satisfies vhold=1, the current h[i] bit received by circuit 58 is shifted into the register as bit "th[4]," the previous th[4] bit becomes the new th[3] bit in the register, the previous th[3] bit becomes the new th[2] bit in the register, the previous th[2] bit becomes the new th[1] bit in the register, and the previous th[1] bit becomes the new th[0] bit in the register. If vhold=0 and holdc=0, the previous "th[4]" bit (the bit shifted into the register on the previous cycle) becomes the new "th[4]" bit, the previous th[3] bit becomes the new th[3] bit in the register, the previous th[2] bit becomes the new th[2] bit in the register, the previous th[1] bit becomes the new th[1] bit in the register, and the previous th[0] bit becomes the new th[0] bit in the register. Because vhold=0 indicates that the system is in the above-mentioned "no information" state, the system ignores the current value of h[i] in the "no information" state and the contents of the register remain unchanged. When the "holdc" bit satisfies holdc=1, all the register bits are flushed to zero (i.e., th[4] is forced to the value th[4]=0, th[3] is forced to the value th[3]=0, th[2] is forced to the value th[2]=0, th[1] is forced to the value th[1]=0, and th[0] is forced to the value th[0]=0). As will be explained below with reference to OR gate 61, holdc=1 when one of the output bits ("up" or "down") asserted to FSM 33 goes high to indicate that the sampling position should be changed, or when "holdb" goes low to indicate that all of th[0], th[1], th[2], th[3], and th[4] are high. Thus, the contents of the shift register in circuit 58 are "flushed" to zero each time logic 31 determines that the sampling position should be changed, or when five successive values of h[i] (asserted to logic 31) indicate that the phase of the oversampling clock is aligned with the phase of the data being sampled.

NAND5 gate 53 outputs the "upb" bit in response to the five bits tu[0:4] being shifted through the shift register in circuit 54, such that upb=~(tu[0] & tu[1] & tu[2] & tu[3] & tu[4]). Thus, upb=0 when the phase of the oversampling clock has lagged the phase of the data being sampled for five cycles of clock CLK. Inverter 63 generates the complement (~upb) of the upb bit (from NAND5 circuit 53) and asserts ~upb to one input of multiplexer M3. When multiplexer M3 selects the value ~upb, the output of M3 ("up") is the value ~upb. In response to the value up=1, finite state machine 33 effectively increases the phase of the oversampling clock by causing an appropriate change in the sampling position.

NAND5 gate 55 outputs the "downb" bit in response to the five bits td[0:4] being shifted through the shift register in circuit 56, such that downb=~(td[0] & td[1] & td[2] & td[3] & td[4]). Thus, downb=0 when the phase of the oversampling clock has lead the phase of the data being sampled for five cycles of clock CLK. Inverter 64 generates the complement (~downb) of the downb bit (from NAND5 circuit 55) and asserts ~downb to one input of multiplexer M4. When multiplexer M4 selects the value ~downb, the output of M4 ("down") is the value ~downb. In response to the value down=1, finite state machine 33 effectively decreases the phase of the oversampling clock by causing an appropriate change in the sampling position.

NAND5 gate 57 outputs the "holdb" bit in response to the five bits th[0:4] being shifted through the shift register in circuit 58, such that holdb=~(th[0] & th[1] & th[2] & th[3] & th[4]). Thus, holdb=0 when the oversampling clock is aligned with the data being sampled for five cycles of clock CLK. In response to the value holdb=0, OR gate 61 causes "holdc" to satisfy holdc=1.

NAND gate 60 generates the "flush" bit in response to bit upb from NAND5 circuit 53 and the bit downb from NAND5 circuit 55, such that flush=~(upb & downb).

Inverter 62 generates the complement (~holdb) of the holdb bit (from NAND5 circuit 57), and OR gate 61 generates the "flush" bit in response to flush bit from NAND gate 60 and the bit ~holdb from inverter 62, such that holdc=~holdb|flush.

The sample selection circuitry of FIG. 3 implements selective low pass filtering in the sense that it is operable in a low pass filtering mode or a non-low-pass filtering mode depending on the value of binary control bit ZTSEL. Specifically, multiplexers M3 and M4 (shown in FIG. 5) of logic 31 respond to a first value of ZTSEL (i.e., ZTSEL=0, when the ZTSEL bit is generated by the FIG. 6 implementation of logic 32 to be described below) by selecting, as output bits "up" and "down" for assertion to FSM 33, sampling position selection bits (~upb and ~downb, respectively) generated in response to samples generated in five consecutive cycles of clock CLK. Multiplexers M3 and M4 respond to the other value of ZTSEL (i.e., ZTSEL=1, when the ZTSEL bit is generated by the FIG. 6 implementation of logic 32 to be described below) by selecting, as output bits "up" and "down" for assertion to FSM 33, sampling position selection bits (tu[4] and td[4], respectively) generated in response to samples generated in a single cycle of clock CLK. Thus, in the non-low-pass filtering mode, "up" is high (to cause FSM to increase the phase of the oversampling clock) when tu[4] is high, and in the low-pass filtering mode, "up" is high (to cause FSM to increase the phase of the oversampling clock) only when all of tu[4], tu[3], tu[2], tu[1], and tu[0] are high.

As will be explained below in greater detail with reference to FIG. 6, logic circuitry 32 generates the binary control bit ZTSEL in such a manner that its value is indicative of the frequency (i.e., bit rate) of the data signal from which samples osd[0:17] are taken. Circuitry 32 is typically implemented so that ZTSEL is high when the bit rate of the data signal is below a first predetermined threshold value, and ZTSEL is low when the bit rate of the data signal exceeds a second predetermined threshold value (the second predetermined threshold value is higher than the first predetermined threshold value in the case that circuitry 32 implements hysteresis). In preferred embodiments, the circuitry for generating ZTSEL implements low-pass filtering and/or hysteresis, to avoid excessive transitions in the value of ZTSEL that would otherwise result from transient phenomena.

Variations on the sample selection circuitry of FIG. 3 implement variable low pass filtering in any of many different ways. For example, in one such variation, there are two different low-pass filtering modes: one in which the output bits "up" and "down" asserted to FSM 33 are generated in response to samples generated in a relatively large number N of consecutive cycles of clock CLK; and another in which the output bits "up" and "down" asserted to FSM 33 are generated in response to samples generated in a relatively small number M of consecutive cycles of clock CLK, where M>1, N>1, and N>M.

The sample selection circuitry of FIG. 3 implements a decision loop to choose a best sampling position. The decision loop generates control words P[0:4], and each control word P[0:4] selects a best sampling position for a corresponding set of samples of a data signal. In accordance with the invention, the FIG. 3 circuitry is designed to reduce the number of dead cycles (relative to that of conventional sample selection circuits) by generating possible solutions in parallel and moving the feedback point so that it occurs as late as practical. Specifically, the feedback point in the FIG. 3 circuit is the point at which bits upf[0:4], downf[0:4], and holdf[0:4] have been generated by logic circuitry 30 and asserted to the inputs of multiplexer M2, and corresponding samples osd[4:17] of the data signal have been asserted to inputs of multiplexer M1. The bits upf[0:4], downf[0:4], and holdf[0:4] are indicative of the alignment of the oversampling clock (clock OCLK of FIG. 2) relative to the portion of the data signal which has been sampled to generate the samples osd[4:17].

In a class of phase trackers that includes the phase tracker of FIG. 3, each phase tracker generates feedback from a set of samples (generated during an "n"th clock cycle) for use in selecting a subset of a subsequently generated set of samples (generated during the "(n+1+Q)"th clock cycle). For each such phase tracker, the number of dead cycles is the number "Q." The phase tracker has no dead cycles (i.e., Q=0) if it selects a subset of a set of samples (generated during an "(n+1)"th clock cycle) using feedback generated from the previous set of samples (generated during the "n"th clock cycle), for each value of "n."

The FIG. 3 circuit can be implemented to have no dead cycles (Q=0). When it is implemented to have no dead cycles, the output of multiplexer M1 is always valid, after an initial clock cycle in which a subset ("osd[4:17]") of a first set of samples osd[0:17] is asserted to multiplexer M1. During the initial clock cycle, the output of multiplexer M1 is not valid, since (at that time) circuit element 33 will not yet have generated sampling position selection bits P[0:4] in response to the first set of samples osd[0:17]. Due to its design, the number of dead cycles of the FIG. 3 circuit is Q=(R−1), where R is the number of clock cycles required for circuit elements 31, 32, and 33 to generate (and assert to multiplexers M1 and M2) sampling position selection bits P[0:4] in response to a set of three bits u[i], d[i], and h[i] asserted at the output of multiplexer M2 (where the bits u[i], d[i], and h[i] have been generated in response to a set of samples osd[4:17]). The non-low-pass-filtering mode of the circuitry described with reference to FIGS. 3, 4, and 5 can be implemented with R=1. Specifically, logic 31 and 32 can be implemented so that no cycles of clock CLK are needed for assertion of bits "up" and "down" from logic 31 to FSM 33 (in response to the output of multiplexer M2), and FSM 33 can be implemented so that only one cycle of clock CLK is needed for assertion of bits P[0:4] from FSM 33 (in response to the "up" and "down" bits from logic 31) to multiplexers M1 and M2.

To appreciate the dead cycle reduction resulting from the design of the FIG. 3 embodiment, consider a variation on the FIG. 3 circuit in which logic 30 is replaced by conventional logic configured to generate only one value upf[i], one value downf[i], and one value holdf[i], in response to each set of samples osd[0:17] and one set of sampling position selection bits P[0:4]. Such variation on the FIG. 3 circuit would have more dead cycles than does the FIG. 3 circuit. Specifically, during one clock cycle, the conventional logic (replacing logic 30) would generate values upf[i], downf[i], and holdf [i] in response to an "N+2"th set of samples osd[0:17], while element R7 asserts (to multiplexer M2) values u[i], d[i], and h[i] generated from the "N+1"th set of samples osd[0:17], and while FSM 33 generates sampling position selection bits P[0:4] generated from a previous set of samples osd[0:17]. Thus, by the time these selection bits P[0:4] have been fed back to the conventional logic, the "(N+3)"th set of samples osd[0:17] is being asserted to the inputs of the conventional logic. Thus, the selection bits P[0:4] are not available to generate values u[i], d[i], and h[i] for the "N+2"th and "N+1"th set of samples osd[0:17]. Accordingly, the number of dead cycles of the variation on the FIG. 3 circuit is Q+2, where Q is the number of dead cycles of the FIG. 3 circuit.

Figure 6:
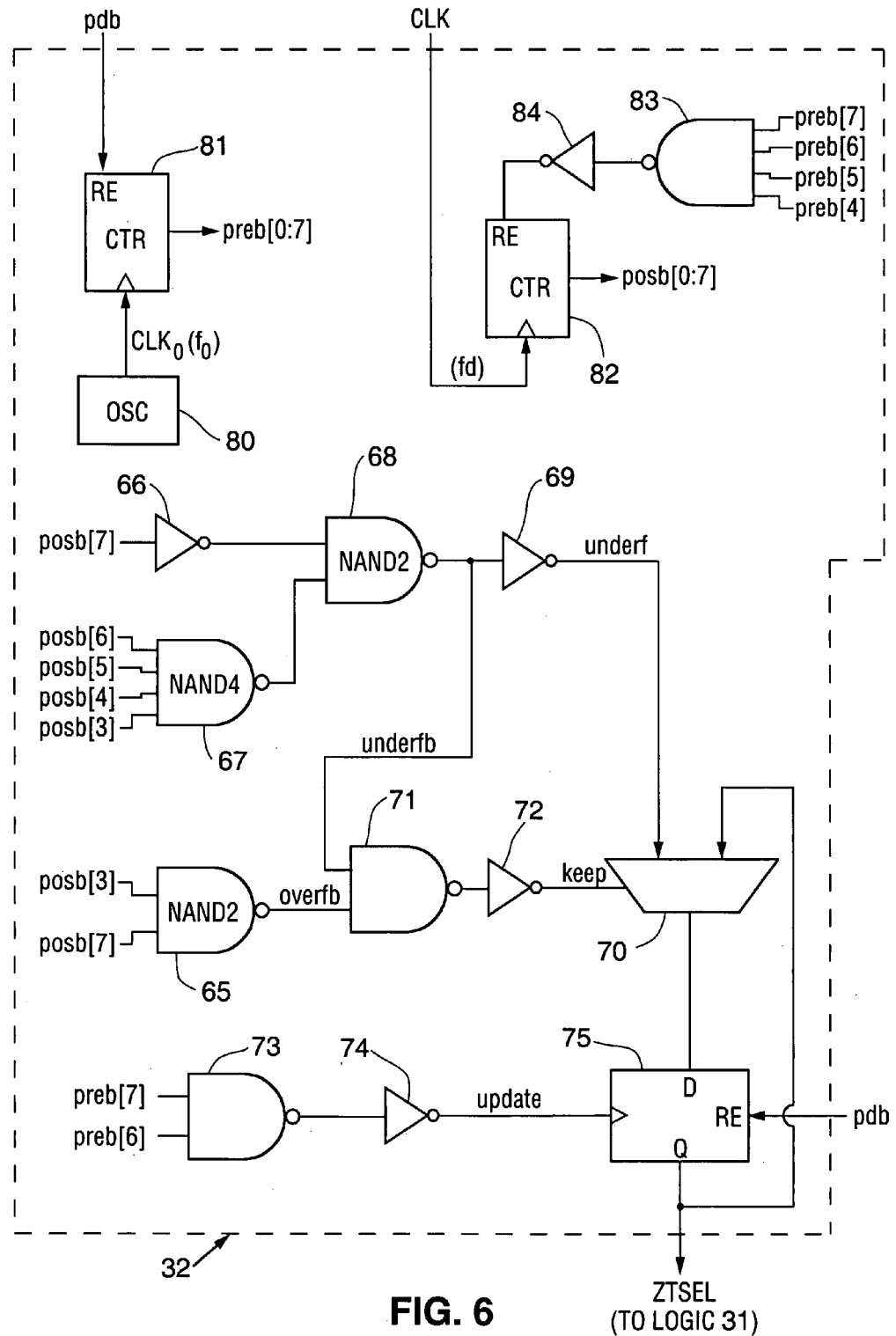
FIG. 6 is a block diagram of a preferred implementation of logic circuitry 32 of FIG. 3, which generate control bit "ZTSEL."

Next, with reference to FIG. 6, we describe an implementation of logic circuitry 32 of FIG. 3, for generating the input clock frequency "zone" control signal ZTSEL. The FIG. 6 implementation of logic circuitry 32 includes two 8-bit counters (81 and 82), and oscillator 80 which asserts a clock CLKo (having predetermined frequency "fo") to counter 81. In a preferred implementation in which the FIG. 3 circuit determines sampling positions for TMDS-encoded video data, fo=65 MHz. In general, the predetermined frequency "fo" should be chosen to be appropriate for the expected range of bit rates of the data to be oversampled.

Counter 81 increments its output word, preb[0:7], once per cycle of the clock CLKo, unless reset in response to power up bit "pdb." Bit "pdb" is pulsed high when the FIG. 3 circuit is powered up.

Counter 82 increments its output word, pos[0:7], once per cycle of clock CLK, unless it is reset by the output of inverter 84. Clock signal CLK is generated by clock generation circuit 26 (of FIG. 2) and has a frequency (fd) which is proportional to the bit rate of the data signal being oversampled. As noted above, the frequency fd of clock signal CLK (sometimes referred to herein as the "data frequency") typically satisfies fd=(M*N)/Z Hz, where the data signal has bit rate equal to N bits per second, M is a small integer, and Z is an integer greater than two. NAND4 gate 83 receives the four most significant bits (preb[7:4]) of counter 81's output word preb[0:7], and asserts an output value ~(preb[7] & preb[6] & preb[5] & preb[4]). Inverter 84 asserts the complement (preb[7] & preb[6] & preb[5] & preb[4]) of this value to the reset input of counter 82. Thus, counter 82 is reset once per each 128 cycles of oscillator clock CLKo.

Inverter 6 is coupled to receive most significant bit, posb[7], of counter 82's output, the four inputs of NAND4 gate 67 are coupled to receive the next four most significant bits, posb[6:3], of counter 82's output, the two inputs of NAND gate 65 are coupled to receive bits posb[3] and posb[7] of counter 82's output, and the two inputs of NAND2 gate 73 are coupled to receive the two most significant bits, preb[7] and preb[6], of counter 81's output.

The outputs of inverter 66 and NAND4 gate 67 are coupled to the inputs of NAND gate 68. Inverter 69 is coupled to assert the complement of NAND gate 68's output (the bit "underf") to one input of multiplexer 70. The other input of multiplexer 70 is coupled to the output of flip-flop 75, to receive flip-flop 75's current output bit (ZTSEL), which is the control bit ZTSEL asserted by the FIG. 5 circuit to multiplexers M3 and M4 of logic circuitry 31 (shown in FIG. 5).

The inputs of NAND gate 71 are coupled to receive the output of NAND gate 68 (the bit "underfb") and the output of NAND gate 65. Inverter 72 is coupled to assert the complement of NAND gate 71's output (the bit "keep") to multiplexer 70. The bit "keep" determines whether multiplexer 70 passes through to its output the bit "underfl" (which occurs when keep=0) or the current output bit (ZTSEL) of flip-flop 75.

Inverter 74 asserts the complement (the value "update") of NAND gate 73's output to flip-flop 75, to cause flip-flop 75 to update its output (bit ZTSEL) once per 128 cycles of oscillator clock CLKo. It is desirable to employ the internally generated value "update" (rather than the externally supplied clock CLK) to clock flip-flop 75, because this allows the FIG. 6 circuit to continue to update the value of ZTSEL even in the case that the externally supplied clock CLK becomes unavailable (e.g., in the event that clock generation circuit 26 of receiver 200 ceases to receive a transmitted clock signal CLOCK that has propagated over a serial link).

In operation of the FIG. 6 circuit, when the data frequency exceeds the oscillator clock frequency (fd>fo), the most significant bit preb[7] of counter 81's output will remain low when the most significant bit pbos[7] of counter 82's output goes high. In response to pbos[7] going high while preb[7] remains low, inverter 69's output satisfies "underf"=0, and the output of inverter 70 satisfies "keep"=0. Thus, multiplexer 70 passes through the value "underf"=0 to the data input of flip-flop 75, and flip-flop 75 outputs the value ZTSEL=0 the next time it updates its output in response to the "update" signal from inverter 74. In response to the value ZTSEL=0, logic 31 enters its low-pass filtering mode (as explained above), as is appropriate in the case of data having high bit rate.

In operation of the FIG. 6 circuit, when the oscillator clock frequency exceeds the data frequency (fo>fd), the value of ZTSEL depends on whether the data frequency is below a predetermined threshold frequency, $f_{th}$, that is lower than the oscillator clock frequency (fo>$f_{th}$). The data frequency matches the threshold frequency (fd=$f_{th}$) when the most significant bit preb[7] of counter 81's output remains low, and the next four most significant bits preb[6:3] of counter 81's output have just reached the value 1111 (the bits preb[6:3] have just undergone a transition from 1110 to 1111), when the most significant bit pbos[7] of counter 82's output goes high. Thus, the data frequency (fd) satisfies fo>fd>$f_{th}$ if the most significant bit preb[7] of counter 81's output remains low, and the bits preb[6:3] of counter 81's output have already reached the value 1111, when the most significant bit pbos[7] of counter 82's output goes high. And, the data frequency (fd) satisfies fo>$f_{th}$>fd if the most significant bit preb[7] of counter 81's output remains low, but at least one of the bits preb[6:3] remains low (equal to zero), when the most significant bit pbos[7] of counter 82's output goes high.

In the case that the data frequency (fd) satisfies fo>$f_{th}$>fd, in response to preb[7] going high while pbos[7] remains low, inverter 69's output satisfies "underf"=1, and the output of inverter 70 satisfies "keep"=0. Thus, multiplexer 70 passes through the value "underf"=1 to the data input of flip-flop 75, and flip-flop 75 outputs the value ZTSEL=1 the next time it updates its output in response to the "update" signal from inverter 74. In response to the value ZTSEL=1, logic 31 enters its non-low-pass filtering mode, as is appropriate in the case of data having low bit rate.

In the case that the data frequency (fd) satisfies fo>fd>$f_{th}$, in response to preb[7] going high while pbos[7] remains low, inverter 69's output satisfies "underf"=0, and the output of inverter 69 satisfies "keep"=1. Thus, multiplexer 70 passes through current value of ZTSEL to the data input of flip-flop 75, and flip-flop 75 outputs the current value ZTSEL the next time it updates its output in response to the "update" signal from inverter 74. As a result, logic 31 remains in whichever operating mode (either the low-pass filtering mode or the non-low-pass filtering mode) it had entered in response to previous value of ZTSEL asserted thereto. In this way, the FIG. 6 circuit implements hysteresis, in the sense that it does not change the value of ZTSEL when the data frequency has value in an intermediate range (fo>fd>$f_{th}$) or when the data frequency undergoes a transition from a high value (fd>fo) to a value in the intermediate range or from a low value ($f_{th}$>fd) to a value in the intermediate range.

An advantage of the FIG. 6 circuit's design is that the FIG. 6 circuit does not require a global reset signal (supplied from an external circuit) in order to operate properly. In the event that the externally supplied bit "pdb" is pulsed high (e.g., when the FIG. 3 circuit is powered up), counter 81 is reset and flip-flop 75 is reset so as to assert ZTSEL with the initial value ZTSEL=1.

In some embodiments, receiver 200 (of FIG. 2) performs 4×-oversampling, 5×-oversampling, or other oversampling (other than 3×-oversampling). Sample selection circuit 23 can be implemented in accordance with the invention in these embodiments.

Typically, a receiver that embodies the invention is implemented as an integrated circuit, and a phase tracker (or data sampling circuit) that embodies the invention is implemented as an integrated circuit or portion of an integrated circuit.

In a class of embodiments, the invention is a method for identifying a sequence of best sampling positions for sampling a data signal having a data eye and a variable bit rate, from samples of the data signal generated using an oversampling clock having sampling positions, where the data eye has a center. The method includes the steps of: (a)

generating, from the samples, relative phase data indicative of the phase of each of at least one of the sampling positions relative to the center of the data eye, for each of a number of tracking periods of the data signal; and (b) determining from the relative phase data which of the sampling positions is best aligned with the center of the data eye during each of at least some of the tracking periods, thereby identifying the sequence of best sampling positions. Step (b) includes the steps of: (c) applying a first low-pass filter to the relative phase data for at least one of the tracking periods in response to determining that the data signal's bit rate is in a first frequency range; and (d) applying one of a second low-pass filter and no low-pass filter to the relative phase data for at least another one of the tracking periods in response to determining that the data signal's bit rate is in a second frequency range, where the second frequency range is different than the first frequency range and the second low-pass filter is different than the first low-pass filter. Typically, the first low-pass filter prevents a change in the most recently identified best sampling position unless the relative phase data indicate that the phase of a sampling position of the oversampling clock leads the center of the data eye for N consecutive tracking periods (or lags the center of the data eye for N consecutive tracking periods). In typical cases in which the second low-pass filter is applied in step (c), the method causes a change in sampling position during application of the second low-pass filter only in response to determination that the phase of a sampling position of the oversampling clock leads the center of the data eye for M consecutive tracking periods, or lags the center of the data eye for M consecutive tracking periods, where $2 \leq M$, and M<N (where the first low-pass filter prevents a change in the sampling position unless the relative phase data indicates that the phase of a sampling position of the oversampling clock leads the center of the data eye for N consecutive tracking periods or lags the center of the data eye for N consecutive tracking periods). In typical cases in which no low-pass filter is applied in step (c), the method causes a change in sampling position in response to a determination that the phase of a sampling position of the oversampling clock leads (or lags) the center of the data eye during any one tracking period. In some embodiments, the method includes the step of determining whether the data signal's bit rate is in the first frequency range by generating a count indicative of the number of cycles of a data clock that occur during a predetermined number of cycles of a second clock, and determining that the data signal's bit rate is in the first frequency range only if the count exceeds a predetermined threshold, where the data clock has frequency indicative of the data signal's bit rate and the second clock has a fixed, predetermined frequency.

Preferred embodiments of the methods described in the previous paragraph implement hysteresis. For example, in some such preferred embodiments, the second frequency range is distinct from (and lower than) the first frequency range, and the second frequency range is separated from the first frequency range by a third frequency range. In these embodiments, after application of the first low-pass filter has begun, application of the first low-pass filter continues in response to a determination that the data signal's bit rate has decreased from a value in the first frequency range to a value in the third frequency range but above the second frequency range, and after application of the first low-pass filter has ceased, the first low-pass filter is not applied again in response to a determination that the data signal's bit rate has increased from a value in the second frequency range to a value in the third frequency range but below the first frequency range.

In some embodiments, the invention is a method for selecting samples of a data signal having a data eye, where the data eye has a center and the samples have been generated by oversampling the data signal using an oversampling clock, said method including the steps of:

(a) generating sampling position control data in response to relative phase data, where the relative phase data are indicative of the phase of a selected sampling position of the oversampling clock relative to the center of the data eye during at least one tracking period of said data signal;

(b) generating additional relative phase data, wherein the additional relative phase data are indicative of the phase of each of multiple sampling positions of the oversampling clock relative to the center of the data eye during a subsequent tracking period of said data signal;

(c) after step (b), selecting a subset of a set of the samples in response to the sampling position control data, said set of the samples having been generated by oversampling the data signal during the subsequent tracking period, and said subset of the set of the samples having been generated at the selected sampling position, and selecting a subset of the additional relative phase data in response to the sampling position control data, said subset of the additional relative phase data being indicative of the phase of the selected sampling position relative to the center of the data eye during the subsequent tracking period of said data signal; and (d) after step (c), generating updated sampling position control data in response to the additional relative phase data selected during step (c).

In other embodiments, the invention is a method for selecting samples of a data signal having a data eye, where the data eye has a center and the samples have been generated by oversampling the data signal using an oversampling clock, said method including the steps of:

(a) generating sampling position control data in response to relative phase data, where the relative phase data are indicative of the phase of a selected sampling position of the oversampling clock relative to the center of the data eye during at least one tracking period of said data signal;

(b) generating additional relative phase data, wherein the additional relative phase data are indicative of the phase of each of multiple sampling positions of the oversampling clock relative to the center of the data eye during a subsequent tracking period of said data signal;

(c) after step (b), selecting a subset of a set of the samples in response to the sampling position control data, said set of the samples having been generated by oversampling the data signal during one tracking period of said at least one tracking period, and said subset of the set of the samples having been generated at the selected sampling position, and selecting a subset of the additional relative phase data in response to the sampling position control data, said subset of the additional relative phase data being indicative of the phase of the selected sampling position relative to the center of the data eye during the subsequent tracking period of said data signal; and (d) after step (c), generating updated sampling position control data in response to the additional relative phase data selected during step (c).

Some embodiments of the method of either of the two previous paragraphs implement low-pass filtering. In such embodiments, the relative phase data employed in step (a) to generate the sampling position control data are indicative of the phase of the selected sampling position of the oversampling clock relative to the center of the data eye during each of at least two consecutive tracking periods of said data signal, and the subset of the additional relative phase data employed in step (d) (to generate the updated sampling position control data) is indicative of the phase of the selected sampling position of the oversampling clock relative to the center of the data eye during each of at least two consecutive tracking periods of said data signal including the subsequent tracking period.

In another class of embodiments, the invention is a method for identifying a sequence of selected sampling positions for sampling a data signal by processing a sequence of sample sets, where each of the sample sets consists of samples of the data signal that have been generated by oversampling said data signal during a different tracking period, said method including the steps of:

for each of the sample sets, determining whether said each of the sample sets indicates that the data signal has less than a predetermined number of transitions during the tracking period in which said each of the sample sets was generated; and identifying the sequence of selected sampling positions by processing the sequence of sample sets, including by selecting a different sampling position to replace a previously selected sampling position only in response to each of the sample sets that indicates that the data signal has at least the predetermined number of transitions during the tracking period in which said each of the sample sets was generated, but not in response to any of the sample sets that indicates that the data signal has less than the predetermined number of transitions during the tracking period in which said any of the sample sets was generated.

In the specific embodiments described herein, a best sampling position is determined based on previous samples. However, since the phase tracking operation is performed in a sampled data domain, it is also possible to implement the invention so that a best sampling position is determined based on later samples (e.g., the selection of a best sampling position for samples generated during a time interval is made based on samples that have been generated during a later time interval).

It should be understood that while some embodiments of the present invention are illustrated and described herein, the invention is defined by the claims and is not to be limited to the specific embodiments described and shown.

What is claimed is:

1. A method for identifying a sequence of best sampling positions for sampling a data signal having a data eye and a variable bit rate, from samples of the data signal generated using an oversampling clock having sampling positions, where the data eye has a center, said method including the steps of:
   (a) generating, from the samples, relative phase data indicative of the phase of each of at least one of the sampling positions relative to the center of the data eye, for each of a number of tracking periods of the data signal; and
   (b) determining from the relative phase data which of the sampling positions is best aligned with the center of the data eye during each of at least some of the tracking periods, thereby identifying the sequence of best sampling positions, wherein step (b) includes the steps of:
   (c) applying a first low-pass filter to the relative phase data for at least one of the tracking periods in response to determining that the data signal's bit rate is in a first frequency range; and
   (d) applying one of a second low-pass filter and no low-pass filter to the relative phase data for at least another one of the tracking periods in response to determining that the data signal's bit rate is in a second frequency range, where the second frequency range is different than the first frequency range and the second low-pass filter is different than the first low-pass filter.

2. The method of claim 1, wherein step (c) includes the steps of:
   generating filtered data by applying the first low-pass filter to the relative phase data for a first sequence of the tracking periods; and
   when one of the sampling positions has been identified as one of the best sampling positions, continuing to identify said one of the sampling positions as said one of the best sampling positions until the filtered data indicate that said one of the sampling positions has phase that leads the center of the data eye for N consecutive ones of the first sequence of the tracking periods, or lags the center of the data eye for N consecutive ones of the first sequence of the tracking periods.

3. The method of claim 2, wherein the second frequency range is lower than the first frequency range, and step (d) includes the steps of:
   generating additional filtered data by applying the second low-pass filter to the relative phase data for a second sequence of the tracking periods; and
   when one of the sampling positions has been identified as one of the best sampling positions, continuing to identify said one of the sampling positions as said one of the best sampling positions until the additional filtered data indicate that said one of the sampling positions has phase that leads the center of the data eye for M consecutive ones of the second sequence of the tracking periods, or lags the center of the data eye for M consecutive ones of the second sequence of the tracking periods, where $2 \leq M$, and $M<N$.

4. The method of claim 1, wherein the second frequency range is lower than the first frequency range, no low-pass filter is applied to the relative phase data during step (d), and step (d) includes the step of:
   when one of the sampling positions has been identified as one of the best sampling positions, identifying another one of the sampling positions as the best sampling position if the relative phase data indicate that said one of the sampling positions has phase misaligned with the center of the data eye for one of the tracking periods.

5. The method of claim 1, also including the steps of:
   generating a count indicative of the number of cycles of a data clock that occur during a predetermined number of cycles of a second clock having a fixed, predetermined frequency, where the data clock has frequency indicative of the data signal's bit rate; and
   determining that the data signal's bit rate is in the first frequency range only if the count exceeds a predetermined threshold.

6. The method of claim 5, wherein the second frequency range is lower than the first frequency range and separated from the first frequency range by a third frequency range, and also including the steps of:
   determining whether the data signal's bit rate is in the first frequency range, the second frequency range, or the third frequency range;
   after application of the first low-pass filter has begun, continuing to apply the first low-pass filter in response to determining that the data signal's bit rate has decreased from a value in the first frequency range to a value in the third frequency range but above the second frequency range; and after application of the first low-pass filter has ceased, recommencing application of the first low-pass filter only in response to determining that the data signal's bit rate has increased from a value below the first frequency range to a value in the first frequency range.

7. The method of claim 1, also including the step of:
selecting those of the samples that were generated at the sequence of best sampling positions identified in step (b).

8. A method for selecting samples of a data signal having a data eye, where the data eye has a center and the samples have been generated by oversampling the data signal using an oversampling clock, said method including the steps of:
(a) generating sampling position control data in response to relative phase data, where the relative phase data are indicative of the phase of a selected sampling position of the oversampling clock relative to the center of the data eye during at least one tracking period of said data signal;
(b) generating additional relative phase data such that the additional relative phase data are indicative of the phase of each of multiple sampling positions of the oversampling clock relative to the center of the data eye during a subsequent tracking period of the data signal;
(c) after step (b), selecting a subset of a set of the samples and a subset of the additional relative phase data in response to the sampling position control data, wherein the set of the samples has been generated by oversampling the data signal during the subsequent tracking period, the subset of the set of the samples has been generated at the selected sampling position, and the subset of the additional relative phase data is indicative of the phase of the selected sampling position relative to the center of the data eye during the subsequent tracking period; and
(d) after step (c), generating updated sampling position control data in response to the subset of the additional relative phase data selected during step (c).

9. The method of claim 8, wherein the relative phase data employed in step (a) are indicative of the phase of the selected sampling position of the oversampling clock relative to the center of the data eye during each of at least two consecutive tracking periods of said data signal.

10. The method of claim 9, wherein the subset of the additional relative phase data employed in step (d) is indicative of the phase of the selected sampling position of the oversampling clock relative to the center of the data eye during each of at least two consecutive tracking periods of said data signal including the subsequent tracking period.

11. A method for selecting samples of a data signal having a data eye, where the data eye has a center and the samples have been generated by oversampling the data signal using an oversampling clock, said method including the steps of:
(a) generating sampling position control data in response to relative phase data, where the relative phase data are indicative of the phase of a selected sampling position of the oversampling clock relative to the center of the data eye during at least one tracking period of said data signal;
(b) generating additional relative phase data, wherein the additional relative phase data are indicative of the phase of each of multiple sampling positions of the oversampling clock relative to the center of the data eye during a subsequent tracking period of said data signal;
(c) after step (b), selecting a subset of a set of the samples and a subset of the additional relative phase data in response to the sampling position control data, wherein the set of the samples has been generated by oversampling the data signal during one tracking period of said at least one tracking period, the subset of the set of the samples has been generated at the selected sampling position, and the subset of the additional relative phase data is indicative of the phase of the selected sampling position relative to the center of the data eye during the subsequent tracking period; and
(d) after step (c), generating updated sampling position control data in response to the subset of the additional relative phase data selected during step (c).

12. The method of claim 11, wherein the relative phase data employed in step (a) are indicative of the phase of the selected sampling position of the oversampling clock relative to the center of the data eye during each of at least two consecutive tracking periods of said data signal.

13. The method of claim 12, wherein the subset of the additional relative phase data employed in step (d) is indicative of the phase of the selected sampling position of the oversampling clock relative to the center of the data eye during each of at least two consecutive tracking periods of said data signal including the subsequent tracking period.

14. A method for identifying a sequence of selected sampling positions for sampling a data signal by processing a sequence of sample sets, where each of the sample sets consists of samples of the data signal that have been generated by oversampling said data signal during a different tracking period, said method including the steps of:
(a) for each of the sample sets, determining whether said each of the sample sets indicates that the data signal has less than a predetermined number of transitions during the tracking period in which said each of the sample sets was generated; and
(b) identifying the sequence of selected sampling positions by processing the sequence of sample sets, including by selecting a different sampling position to replace a previously selected sampling position only in response to each of the sample sets that indicates that the data signal has at least the predetermined number of transitions during the tracking period in which said each of the sample sets was generated, but not in response to any of the sample sets that indicates that the data signal has less than the predetermined number of transitions during the tracking period in which said any one of the sample sets was generated.

15. The method of claim 14, wherein each of the sample sets consists of samples of the data signal that have been generated by oversampling said data signal using an oversampling clock having sampling positions, and wherein step (b) includes the steps of:
generating, from the sample sets, relative phase data indicative of the phase of each of at least one of the sampling positions of the oversampling clock relative to the center of the data eye, for each of at least two tracking periods of the data signal; and
determining from the relative phase data which of the sampling positions is best aligned with the center of the data eye during each of at least some of the tracking periods, thereby identifying the sequence of selected sampling positions.

16. The method of claim 14, also including the step of:
selecting those of the samples that were generated at the sequence of selected sampling positions identified in step (b).

17. A phase tracker for receiving samples of a data signal having a variable bit rate, said samples having been generated by oversampling the data signal at each of at least two sampling positions, said phase tracker including:

sampling position control circuitry configured to generate, in response to the samples, sampling position control data indicative of a selected one of the sampling positions for each of a sequence of tracking periods of the data signal; and frequency zone detection logic configured to generate a frequency range signal indicative of a frequency range that contains the data signal's bit rate, wherein the sampling position control circuitry includes low-pass filter circuitry coupled to receive the frequency range signal and configured to operate in a first mode when the frequency range signal indicates that the bit rate exceeds a first threshold frequency, wherein the low-pass filter circuitry generates filtered data in the first mode, and the sampling position control circuitry is configured to generate the sampling position control data in response to the filtered data when the low-pass filter circuitry operates in the first mode.

18. The phase tracker of claim 17, wherein the low-pass filter circuitry is configured to operate in a second mode when the frequency range signal indicates that the bit rate is less than a second threshold frequency, the low-pass filter circuitry in the second mode generates differently filtered data, and the sampling position control circuitry is configured to generate the sampling position control data in response to the differently filtered data when the low-pass filter circuitry operates in the second mode.

19. The phase tracker of claim 17, wherein the sampling position control circuitry is configured to disable or bypass the low-pass filter circuitry during generation of the sampling position control data when the frequency range signal indicates that the bit rate is less than a second threshold frequency.

20. A phase tracker configured to receive samples of a data signal having a data eye and a variable bit rate, said samples having been generated by oversampling the data signal at each of at least two sampling positions, where the data eye has a center, said phase tracker including:

sampling position control data generation circuitry configured to generate relative phase data in response to the samples, and to generate intermediate data and sampling position control data in response to the relative phase data, wherein the relative phase data are indicative of the phase of each of the sampling positions relative to the center of the data eye for each of at least two tracking periods of the data signal, and the sampling position control data are indicative of which of the sampling positions is best aligned with the center of the data eye during each of the tracking periods; and frequency zone detection logic configured to generate a frequency range signal indicative of a frequency range that contains the data signal's bit rate, wherein the sampling position control data generation circuitry includes low-pass filter circuitry coupled to receive the frequency range signal and configured to operate in a first mode when the frequency range signal indicates that the bit rate exceeds a first threshold frequency, wherein the low-pass filter circuitry in the first mode applies a first low pass filter to the intermediate data, thereby generating filtered data, and the sampling position control data generation circuitry is configured to generate the sampling position control data in response to the filtered data when the low-pass filter circuitry operates in the first mode.

21. The phase tracker of claim 20, wherein the low-pass filter circuitry is configured to operate in a second mode when the frequency range signal indicates that the bit rate is less than a second threshold frequency, the low-pass filter circuitry in the second mode applies a second low pass filter to the intermediate data, thereby generating differently filtered data, and the sampling position control data generation circuitry is configured to generate the sampling position control data in response to the differently filtered data when the low-pass filter circuitry operates in the second mode.

22. The phase tracker of claim 21, wherein the low-pass filter circuitry has a selectable number of taps, and fewer of the taps are selected when the low-pass filter circuitry operates in the second mode than when the low-pass filter circuitry operates in the first mode.

23. The phase tracker of claim 22, wherein the second threshold frequency is lower than the first threshold frequency.

24. The phase tracker of claim 20, wherein the low-pass filter circuitry is configured to operate in a second mode when the frequency range signal indicates that the bit rate is less than a second threshold frequency, the low-pass filter circuitry in the second mode does not low-pass filter the intermediate data, and the sampling position control data generation circuitry is configured to generate the sampling position control data in response to the intermediate data when the low-pass filter circuitry operates in the second mode.

25. The phase tracker of claim 24, wherein the second threshold frequency is lower than the first threshold frequency.

26. The phase tracker of claim 20, wherein the frequency zone detection logic is configured to generate the frequency range signal so that the frequency range signal exhibits hysteresis.

27. The phase tracker of claim 20, wherein the frequency zone detection logic is configured to generate the frequency range signal so that the frequency range signal has a first value when the bit rate is in a first frequency range and a second value when the bit rate is in a second frequency range, the second frequency range is lower than the first frequency range and separated from the first frequency range by a third frequency range, the frequency zone detection logic is configured to generate the frequency range signal so as to have the first value in response to determining that the bit rate has decreased from a value in the first frequency range to a value in the third frequency range but above the second frequency range, and the frequency zone detection logic is configured to generate the frequency range signal so as to have the second value in response to determining that the bit rate has increased from a value in the second frequency range to a value in the third frequency range.

28. The phase tracker of claim 20, wherein the frequency zone detection logic includes:

a counter configured to generate a count indicative of the number of cycles of a data clock that occur during a predetermined number of cycles of a second clock having a fixed, predetermined frequency, where the data clock has frequency indicative of the data signal's bit; and logic coupled to the counter and configured to generate the frequency range signal in response to the count.

29. A circuit for oversampling a data signal having a data eye and a variable bit rate, where the data eye has a center, said circuit including:

sampling circuitry configured to oversample the data signal, thereby generating samples of the data signal at each of at least two sampling positions;

a phase tracker coupled and configured to generate relative phase data in response to the samples and to generate intermediate data and sampling position control data in response to the relative phase data, wherein the relative phase data are indicative of the phase of each of the sampling positions relative to the center of the data eye for each of at least two tracking periods of the data signal, and the sampling position control data are indicative of which of the sampling positions is best aligned with the center of the data eye during each of the tracking periods; and sample selection circuitry coupled and configured to select a subset of the samples for each of the tracking periods in response to the sampling position control data, wherein the phase tracker includes:

frequency zone detection logic configured to generate a frequency range signal indicative of a frequency range that contains the data signal's bit rate; and low-pass filter circuitry coupled to receive the frequency range signal and configured to operate in a first mode when the frequency range signal indicates that the bit rate exceeds a first threshold frequency, wherein the low-pass filter circuitry in the first mode applies a first low pass filter to the intermediate data, thereby generating filtered data, and the phase tracker is configured to generate the sampling position control data in response to the filtered data when the low-pass filter circuitry operates in the first mode.

30. The circuit of claim 29, wherein the low-pass filter circuitry is configured to operate in a second mode when the frequency range signal indicates that the bit rate is less than a second threshold frequency, the low-pass filter circuitry in the second mode applies a second low pass filter to the intermediate data, thereby generating differently filtered data, and the phase tracker is configured to generate the sampling position control data in response to the differently filtered data when the low-pass filter circuitry operates in the second mode.

31. The circuit of claim 30, wherein the low-pass filter circuitry has a selectable number of taps, and fewer of the taps are selected when the low-pass filter circuitry operates in the second mode than when the low-pass filter circuitry operates in the first mode.

32. The circuit of claim 31, wherein the second threshold frequency is lower than the first threshold frequency.

33. The circuit of claim 29, wherein the low-pass filter circuitry is configured to operate in a second mode when the frequency range signal indicates that the bit rate is less than a second threshold frequency, the low-pass filter circuitry in the second mode does not low-pass filter the intermediate data, and the phase tracker is configured to generate the sampling position control data in response to the intermediate data when the low-pass filter circuitry operates in the second mode.

34. The circuit of claim 33, wherein the second threshold frequency is lower than the first threshold frequency.

35. The circuit of claim 29, wherein the frequency zone detection logic is configured to generate the frequency range signal so that the frequency range signal exhibits hysteresis.

36. The circuit of claim 29, wherein the frequency zone detection logic is configured to generate the frequency range signal so that the frequency range signal has a first value when the bit rate is in a first frequency range and a second value when the bit rate is in a second frequency range, the second frequency range is lower than the first frequency range and separated from the first frequency range by a third frequency range, the frequency zone detection logic is configured to generate the frequency range signal so as to have the first value in response to determining that the bit rate has decreased from a value in the first frequency range to a value in the third frequency range but above the second frequency range, and the frequency zone detection logic is configured to generate the frequency range signal so as to have the second value in response to determining that the bit rate has increased from a value in the second frequency range to a value in the third frequency range.

37. The circuit of claim 29, wherein the frequency zone detection logic includes:

a counter configured to generate a count indicative of the number of cycles of a data clock that occur during a predetermined number of cycles of a second clock having a fixed, predetermined frequency, where the data clock has frequency indicative of the data signal's bit; and logic coupled to the counter and configured to generate the frequency range signal in response to the count.

38. A circuit for oversampling a data signal having a data eye, where the data eye has a center, said circuit including:

sampling circuitry configured to oversample the data signal using an oversampling clock having multiple sampling positions, thereby generating samples of the data signal at each of the sampling positions; and a pipelined phase tracker coupled and configured to generate relative phase data in response to the samples and to generate sampling position control data in response to the relative phase data, wherein the phase tracker includes:

first circuitry coupled and configured to receive those of the samples generated during a tracking period of the data signal and to generate a first quantity of the relative phase data in response to the received samples, wherein the first quantity of the relative phase data is indicative of the phase of each the sampling positions relative to the center of the data eye during the tracking period;

second circuitry coupled to receive the first quantity of the relative phase data, a set of the samples, and a first quantity of the sampling position control data generated in response to a second quantity of the relative phase data indicative of the phase of at least one the sampling positions relative to the center of the data eye during at least one other tracking period of the data signal, wherein the second circuitry is configured to select a subset of the first quantity of the relative phase data and a subset of the set of the samples in response to the first quantity of the sampling position control data, such that the subset of the first quantity of the relative phase data is indicative of the phase of a selected one of the sampling positions relative to the center of the data eye, and such that the subset of the set of the samples was generated at the selected one of the sampling positions; and third circuitry, coupled to receive the subset of the first quantity of the relative phase data and configured to generate a second quantity of the sampling position control data in response thereto.

39. The circuit of claim 38, wherein the set of the samples received by the second circuitry are the samples generated during the tracking period, and the subset of said set of the samples was generated at the selected one of the sampling positions during said tracking period.

40. The circuit of claim 38, wherein the second quantity of the relative phase data is indicative of the phase of one the sampling positions relative to the center of the data eye during each of at least two previous tracking periods of said data signal.

41. A pipelined phase tracker configured to receive samples of a data signal having a data eye, where the data eye has a center and the samples have been generated by oversampling the data signal at each of at least two sampling positions, said phase tracker including:
   first circuitry configured to receive those of the samples generated during a tracking period of the data signal and to generate a first quantity of relative phase data in response to said samples, wherein the first quantity of relative phase data is indicative of the phase of each the sampling positions relative to the center of the data eye during the tracking period;
   second circuitry coupled to receive the first quantity of relative phase data, a set of the samples, and a first quantity of sampling position control data generated in response to a second quantity of relative phase data, wherein the second quantity of relative phase data is indicative of the phase of at least one the sampling positions relative to the center of the data eye during at least one other tracking period, and the second circuitry is configured to select a subset of the first quantity of relative phase data and a subset of the set of the samples in response to the first quantity of sampling position control data, such that the subset of the first quantity of relative phase data is indicative of the phase of a selected one of the sampling positions relative to the center of the data eye, and such that the subset of the set of the samples was generated at the selected one of the sampling positions; and
   third circuitry, coupled to receive the subset of the first quantity of relative phase data and configured to generate a second quantity of sampling position control data in response thereto.

42. The phase tracker of claim 41, wherein the set of the samples received by the second circuitry are the samples generated during the tracking period, and the subset of said set of the samples was generated at the selected one of the sampling positions during said tracking period.

43. The phase tracker of claim 41, wherein the second quantity of relative phase data is indicative of the phase of one the sampling positions relative to the center of the data eye during each of at least two previous tracking periods of said data signal.

44. A circuit for oversampling a data signal, said circuit including:
   sampling circuitry configured to oversample the data signal using an oversampling clock having multiple sampling positions, thereby generating samples of the data signal at each of the sampling positions during each tracking period of a sequence of tracking periods; and
   a phase tracker coupled and configured to receive a sequence of sample sets and to determine a sequence of selected sampling positions for sampling the data signal in response to the sample sets, wherein each of the sample sets is a set of the samples generated during a different one of the tracking periods and each of the selected sampling positions is for a different one of the tracking periods, wherein the phase tracker includes:
   logic circuitry coupled and configured to generate transition data in response to the sample sets, wherein the transition data include transition data for each of the tracking periods indicating whether the data signal has less than a predetermined number of transitions during said each of the tracking periods; and
   additional logic circuitry coupled and configured to determine the sequence of selected sampling positions in response to the transition data and the sample sets, including by selecting an updated sampling position to replace a previously selected sampling position only in response to each of the sample sets for which the transition data indicate that the data signal has at least the predetermined number of transitions during the tracking period in which said each of the sample sets was generated, but not in response to any of the sample sets for which the transition data indicate that the data signal has less than the predetermined number of transitions during the tracking period in which said any of the sample sets was generated.

45. The circuit of claim 44, wherein the data signal has a data eye, the data eye has a center, and the additional logic includes:
   logic configured to generate, from the sample sets, relative phase data indicative of the phase of each of at least one of the sampling positions of the oversampling clock relative to the center of the data eye, for each of at least two of the tracking periods of the data signal; and
   logic configured to determine from the relative phase data which of the sampling positions is best aligned with the center of the data eye during each of at least some of the tracking periods.

46. A phase tracker configured to receive a sequence of sample sets, wherein each of the sample sets is a subset of a sequence of samples of a data signal, the samples in the sequence have been generated using an oversampling clock having multiple sampling positions and include samples of the data signal at each of the sampling positions during each tracking period of a sequence of tracking periods, and each of the sample sets consists of samples generated during a different one of the tracking periods, said phase tracker including:
   logic circuitry configured to generate transition data in response to the sample sets, wherein the transition data include transition data for each of the tracking periods indicating whether the data signal has less than a predetermined number of transitions during said each of the tracking periods; and
   additional logic circuitry coupled and configured to determine a sequence of selected sampling positions for sampling the data signal in response to the transition data and the sample sets, including by selecting an updated sampling position to replace a previously selected sampling position only in response to each of the sample sets for which the transition data indicate that the data signal has at least the predetermined number of transitions during the tracking period in which said each of the sample sets was generated, but not in response to any of the sample sets for which the transition data indicate that the data signal has less than the predetermined number of transitions during the tracking period in which said any of the sample sets was generated, wherein each of the selected sampling positions is for a different one of the tracking periods.

47. The circuit of claim 46, wherein the data signal has a data eye, the data eye has a center, and the additional logic includes:
   logic configured to generate, from the sample sets, relative phase data indicative of the phase of each of at least one of the sampling positions of the oversampling clock relative to the center of the data eye, for each of at least two of the tracking periods of the data signal; and logic configured to determine from the relative phase data which of the sampling positions is best aligned with the center of the data eye during each of at least some of the tracking periods.

48. A receiver configured to receive at least one data signal that has been transmitted over a serial link, said data signal having a data eye and a variable bit rate, where the data eye has a center, said receiver including:

sampling circuitry configured to oversample the data signal; and a phase tracker coupled to receive samples of the data signal from the sampling circuitry, said samples having been generated by oversampling said data signal at each of at least two sampling positions, wherein the phase tracker includes:

sampling position control data generation circuitry coupled and configured to generate relative phase data in response to the samples, and to generate intermediate data and sampling position control data in response to the relative phase data, wherein the relative phase data are indicative of the phase of each of the sampling positions relative to the center of the data eye for each of at least two tracking periods of the data signal, and the sampling position control data are indicative of which of the sampling positions is best aligned with the center of the data eye during each of the tracking periods; and frequency zone detection logic configured to generate a frequency range signal indicative of a frequency range that contains the data signal's bit rate, wherein the sampling position control data generation circuitry includes low-pass filter circuitry coupled to receive the frequency range signal and configured to operate in a first mode when the frequency range signal indicates that the bit rate exceeds a first threshold frequency, wherein the low-pass filter circuitry in the first mode applies a first low pass filter to the intermediate data, thereby generating filtered data, and the sampling position control data generation circuitry is configured to generate the sampling position control data in response to the filtered data when the low-pass filter circuitry operates in the first mode.

49. The receiver claim 48, wherein the low-pass filter circuitry is configured to operate in a second mode when the frequency range signal indicates that the bit rate is less than a second threshold frequency, the low-pass filter circuitry in the second mode applies a second low pass filter to the intermediate data, thereby generating differently filtered data, and the sampling position control data generation circuitry is configured to generate the sampling position control data in response to the differently filtered data when the low-pass filter circuitry operates in the second mode.

50. The receiver of claim 48, wherein the low-pass filter circuitry is configured to operate in a second mode when the frequency range signal indicates that the bit rate is less than a second threshold frequency, the low-pass filter circuitry in the second mode does not low-pass filter the intermediate data, and the sampling position control data generation circuitry is configured to generate the sampling position control data in response to the intermediate data when the low-pass filter circuitry operates in the second mode.

51. The receiver of claim 50, wherein the second threshold frequency is lower than the first threshold frequency.

52. A receiver configured to receive at least one data signal that has been transmitted over a serial link, said data signal having a data eye, where the data eye has a center, said receiver including:

sampling circuitry configured to oversample the data signal; and a pipelined phase tracker coupled to receive samples of the data signal from the sampling circuitry, said samples having been generated by oversampling said data signal at each of at least two sampling positions, wherein the phase tracker includes:

first circuitry coupled and configured to receive those of the samples generated during a tracking period of the data signal and to generate a first quantity of relative phase data in response to said samples, wherein the first quantity of relative phase data is indicative of the phase of each the sampling positions relative to the center of the data eye during the tracking period;

second circuitry coupled to receive the first quantity of relative phase data, a set of the samples, and a first quantity of sampling position control data generated in response to a second quantity of relative phase data, wherein the second quantity of relative phase data is indicative of the phase of at least one the sampling positions relative to the center of the data eye during at least one other tracking period, and the second circuitry is configured to select a subset of the first quantity of relative phase data and a subset of the set of the samples in response to the first quantity of sampling position control data, such that the subset of the first quantity of relative phase data is indicative of the phase of a selected one of the sampling positions relative to the center of the data eye, and such that the subset of the set of the samples was generated at the selected one of the sampling positions; and third circuitry, coupled to receive the subset of the first quantity of relative phase data and configured to generate a second quantity of sampling position control data in response thereto.

53. The receiver of claim 52, wherein the set of the samples received by the second circuitry are the samples generated during the tracking period, and the subset of said set of the samples was generated at the selected one of the sampling positions during said tracking period.

54. A receiver configured to receive at least one data signal that has been transmitted over a serial link, said data signal having a data eye, where the data eye has a center, said receiver including:

sampling circuitry configured to generate a sequence of samples of the data signal using an oversampling clock having multiple sampling positions, so that the samples in the sequence include samples of the data signal at each of the sampling positions during each tracking period of a sequence of tracking periods; and a phase tracker coupled to receive a sequence of sample sets, wherein each of the sample sets is a subset of the sequence of samples of the data signal, each of the sample sets consists of samples generated during a different one of the tracking periods, and the phase tracker includes:

logic circuitry coupled and configured to generate transition data in response to the sample sets, wherein the transition data include transition data for each of the tracking periods indicating whether the data signal has less than a predetermined number of transitions during said each of the tracking periods; and additional logic circuitry coupled and configured to determine a sequence of selected sampling positions for sampling the data signal in response to the transition data and the sample sets, including by selecting an updated sampling position to replace a previously selected sampling position only in response to each of the sample sets for which the transition data indicate that the data signal has at least the predetermined number of transitions during the tracking period in which said each of the sample sets was generated, but not in response to any of the sample sets for which the transition data indicate that the data signal has less than the predetermined number of transitions during the tracking period in which said any of the sample sets was generated, wherein each of the selected sampling positions is for a different one of the tracking periods.

* * * * *